(12) United States Patent
Mano

(10) Patent No.: US 10,133,520 B2
(45) Date of Patent: Nov. 20, 2018

(54) DETECTION DEVICE FOR PROHIBITED RELATIONSHIP AMONG SETTING VALUES

(71) Applicant: KONICA MINOLTA, INC., Tokyo (JP)

(72) Inventor: Jun Mano, Amagasaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/645,815

(22) Filed: Jul. 10, 2017

(65) Prior Publication Data

US 2018/0011665 A1 Jan. 11, 2018

(30) Foreign Application Priority Data

Jul. 11, 2016 (JP) .................................. 2016-136880

(51) Int. Cl.
*G06F 3/12* (2006.01)
*H04N 1/00* (2006.01)

(52) U.S. Cl.
CPC ............ *G06F 3/121* (2013.01); *G06F 3/1203* (2013.01); *G06F 3/1234* (2013.01); *G06F 3/1284* (2013.01); *H04N 1/00411* (2013.01); *H04N 2201/0094* (2013.01)

(58) Field of Classification Search
None
See application file for complete search history.

(56) References Cited

U.S. PATENT DOCUMENTS

| 2008/0137139 A1* | 6/2008 | Yamada ................. G06F 3/1208 358/1.15 |
| 2011/0128578 A1* | 6/2011 | Umenaga .............. G06F 3/1204 358/1.15 |
| 2014/0022579 A1* | 1/2014 | Edamatsu .......... G06K 15/1805 358/1.13 |

FOREIGN PATENT DOCUMENTS

JP 2014-232503 A 12/2014

* cited by examiner

*Primary Examiner* — Frantz Bataille
(74) *Attorney, Agent, or Firm* — Baker & Hostetler LLP

(57) ABSTRACT

A terminal device as a prohibited relationship detection device detects presence or absence of a prohibited relationship, when change of a setting value related to a job condition is received, based on a PJL (Printer Job Language) index table to classify a plurality of configuration items of which input of setting values is received on the terminal device into a plurality of resolve tables, a plurality of resolve PJL tables showing relationship between setting values of which input is received on the terminal device and the PJL values which indicate the setting values of which input is received on the terminal device in the PJL, and an inter resolve PJL table prohibition table which shows a combination of setting values having a prohibited relationship, of which input is received on the terminal device.

10 Claims, 36 Drawing Sheets

| SetItem1 | Item1 DATA TYPE | SetItem2 | Item2 DATA TYPE | SetItem3 | Item3 DATA TYPE | RESOLVE PJL TABLE ID |
|---|---|---|---|---|---|---|
| B1 | VALUE SELECT | B2 | VALUE SELECT | | | T1 |
| B4 | VALUE | B5 | VALUE | B3 | VALUE | T2 |
| B6 | VALUE | B8 | VALUE | | | T3 |
| B7_1 | String | | | | | T4 |
| B7_2 | VALUE SELECT | B9 | VALUE SELECT | | | T5 |
| B7_3 | VALUE SELECT | | | | | T6 |

| RESOLVE PJL TABLE ID | RESOLVE PJL TABLE INNER Index | TABLE TYPE | PJL calculation method | INPUT INFORMATION ||||||| 
| --- | --- | --- | --- | --- | --- | --- | --- | --- | --- | --- |
| | | | | CONFIGURATION ITEM INFORMATION |||| CONFIGURATION ITEM INFORMATION |||
| | | | | SetItem_1 | SetItem_1 _Value | DATA TYPE | VALUE condition | SetItem_2 | SetItem_2 _Value | DATA TYPE | VALUE condition |
| T1 | T11 | 1-dimension variable type | mapping | B1 | b11 | VALUE SELECT | N/A | B2 | b21 | VALUE SELECT | N/A |
| | T12 | | | | b12 | | | | b22 | | |

| OUTPUT INFO ||
| --- | --- |
| PJL item information ||
| PJL_Item_1 | PJL_Item_1 _Value |
| A1 | a11 |
| | a12 |

| RESOLVE PJL TABLE ID | RESOLVE PJL TABLE INNER Index | TABLE TYPE | PJL calculation method | INPUT INFORMATION ||||||||
|---|---|---|---|---|---|---|---|---|---|---|
| | | | | CONFIGURATION ITEM INFORMATION ||||| CONFIGURATION ITEM INFORMATION |||
| | | | | SetItem_1 | SetItem_1 _Value | DATA TYPE | VALUE condition | SetItem_2 | SetItem_2 _Value | DATA TYPE | VALUE condition |
| T2 | T21 | 1-dimension variable type | calculation | B4 | N/A | numerical value | N/A | B5 | N/A | numerical value | N/A |

| INPUT INFORMATION |||| OUTPUT INFO ||
|---|---|---|---|---|---|
| CONFIGURATION ITEM INFORMATION |||| PJL item information ||
| SetItem_3 | SetItem_3 _Value | DATA TYPE | VALUE condition | PJL_ Item_1 | PJL_Item_1 _Value |
| B3 | N/A | numerical value | N/A | A2 | B4*B5*B3 |

| RESOLVE PJL TABLE ID | RESOLVE PJL TABLE INNER Index | TABLE TYPE | PJL calculation method | INPUT INFORMATION ||||||
|---|---|---|---|---|---|---|---|---|---|
| | | | | CONFIGURATION ITEM INFORMATION |||| CONFIGURATION ITEM INFORMATION |||
| | | | | SetItem_1 | SetItem_1 _Value | DATA TYPE | VALUE condition | SetItem_2 | SetItem_2 _Value | DATA TYPE | VALUE condition |
| T3 | T31 | 1-dimension variable type | calculation | B6 | N/A | numerical value | B6<100 | B8 | N/A | numerical value | N/A |
| | T32 | | | | | | B6≧100 | | | | N/A |

| OUTPUT INFO ||
|---|---|
| PJL item information ||
| PJL_ Item_1 | PJL_Item_1 _Value |
| A3 | B6*B8 |
| | B6*B8*2 |

INPUT INFORMATION

| RESOLVE PJL TABLE ID | RESOLVE PJL TABLE INNER Index | TABLE TYPE | PJL calculation method | CONFIGURATION ITEM INFORMATION | | | |
|---|---|---|---|---|---|---|---|
| | | | | SetItem_1 | SetItem_1 _Value | DATA TYPE | VALUE condition |
| T4 | T41 | indexed type | calculation | B7_1 | N/A | String | B7_1.length≦100 |
| | T42 | | | | N/A | | B7_1.length>100 |

OUTPUT INFO

| PJL item information | PJL_Item_1 _Value | PJL item information | PJL_Item_2 _Value |
|---|---|---|---|
| PJL_Item_1 | B7_1 | N/A | N/A |
| A4_1 | B7_1.substr(0,100) | A4_2 | B7_1.substr(100) |

| RESOLVE PJL TABLE ID | RESOLVE PJL TABLE INNER Index | TABLE TYPE | PJL calculation method | INPUT INFORMATION ||||||
|---|---|---|---|---|---|---|---|---|---|
| | | | | CONFIGURATION ITEM INFORMATION |||| CONFIGURATION ITEM INFORMATION |||
| | | | | SetItem_1 | SetItem_1 _Value | DATA TYPE | VALUE condition | SetItem_2 | SetItem_2 _Value | DATA TYPE | VALUE condition |
| T5 | T51 | indexed type | mapping | B7_2 | b71 | VALUE SELECT | N/A | B9 | b91 | VALUE SELECT | N/A |
| | T52 | | | | b72 | | | | b92 | | |
| | T53 | | | | b73 | | | | b93 | | |

OUTPUT INFO

| PJL item information || PJL item information ||
|---|---|---|---|
| PJL_Item_1 | PJL_Item_1 _Value | PJL_Item_2 | PJL_Item_2 _Value |
| A5_1 | a51 | A5_2 | a53 |
| A5_1 | a52 | A5_2 | a53 |
| A5_1 | a51 | A5_2 | a54 |

| RESOLVE PJL TABLE ID | RESOLVE PJL TABLE INNER Index | TABLE TYPE | PJL calculation method | INPUT INFORMATION ||| OUTPUT INFO ||
|---|---|---|---|---|---|---|---|---|
| | | | | CONFIGURATION ITEM INFORMATION ||| PJL item information ||
| | | | | SetItem_1 _Value | DATA TYPE | VALUE condition | PJL_Item_1 | PJL_Item_1 _Value |
| T6 | T61 | indexed type | mapping | b74 | VALUE SELECT | N/A | A6 | a61 |
| | T62 | | | b75 | | | | a62 |
| | T63 | | | b76 | | | | a61 |

| PJL_Item | Item1 | | | Item2 | | | Item3 | | |
| --- | --- | --- | --- | --- | --- | --- | --- | --- | --- |
| | PJL DATA TYPE | PJL_Item_value | PJL_Item | PJL DATA TYPE | PJL_Item_value | PJL_Item | PJL DATA TYPE | PJL_Item_value | |
| A1 | FIXED VALUE TYPE | a11 | A6 | FIXED VALUE TYPE | a61 | | | | ← 2051a(2051) |
| A2 | VARIABLE TYPE VALUE | P3(A2) | A3 | VARIABLE TYPE VALUE | P5(A3) | | | | ← 2051b(2051) |
| A4_1 | VARIABLE CHARACTER STRING | (ARBITRARY) | A1 | FIXED VALUE TYPE | a12 | | | | ← 2051c(2051) |
| ... | ... | ... | ... | ... | ... | ... | ... | ... | |

| RESOLVE PJL TABLE ID | Item1 | | | Item2 | | | Item3 | | |
|---|---|---|---|---|---|---|---|---|---|
| | RESOLVE PJL TABLE INNER Index | PJL value CONDITION | RESOLVE PJL TABLE ID | RESOLVE PJL TABLE INNER Index | PJL value CONDITION | RESOLVE PJL TABLE ID | RESOLVE PJL TABLE INNER Index | PJL value CONDITION |
| T1 | T11 | — | T6 | T61 | — | | | | 2052a(2052) |
| T1 | T11 | — | T6 | T63 | — | | | | 2052b(2052) |
| T2 | T21 | P3(A2) | T3 | T31 | P5(A3) | | | | 2052c(2052) |
| T2 | T21 | P3(A2) | T3 | T32 | P5(A3) | | | | 2052d(2052) |
| T4 | T41 | (arbitrary) | T1 | T12 | — | | | | 2052e(2052) |
| T4 | T42 | (arbitrary) | T1 | T12 | — | | | | 2052f(2052) |
| ... | ... | ... | ... | ... | ... | ... | ... | ... | |

FIG. 28

| Sheet Size | | | Number of the punching holes | | | | | | |
|---|---|---|---|---|---|---|---|---|---|
| | | | 2 holes | | | 3 holes | | | |
| | | | Punching location | | | Punching location | | | |
| | | | TOP | LEFT | RIGHT | TOP | LEFT | RIGHT | |
| A3 | Document Orientation | Vertical | ○ | ○ | ○ | ○ | ○ | ○ | |
| | | Horizontal | × | ○ | ○ | × | ○ | ○ | |
| A4 | Document Orientation | Vertical | ○ | ○ | ○ | × | ○ | ○ | |
| | | Horizontal | ○ | ○ | ○ | ○ | ○ | ○ | |

| ITEM | PRIORITY |
|---|---|
| Folding | 2 |
| Paper Tray | 4 |
| Sorting | 4 |
| Document Orientation | 4 |
| Perfect Binding Setting | 3 |
| Finisher | 1 |
| Sheet Size | 2 |
| Number of the Punching Holes | 2 |
| Punching Location | 3 |
| ⋮ | ⋮ |

| | ITEM | SETTING VALUE | CONTROL TYPE | PAIRED CheckBox | Recover Value | | |
|---|---|---|---|---|---|---|---|
| | | | | | Recover Value1 | Recover Value2 | Recover Value3 |
| 3051(3050) | Folding | Off | CheckBox + ComboBox | — | — | — | — |
| | | Center fold | | CheckFold | Off(CheckBox) | — | — |
| | | Three fold | | | Off(CheckBox) | — | — |
| 3052(3050) | Paper Tray | Tray1 | ComboBox | — | Tray3 | Tray2 | — |
| | | Tray2 | | | Tray1 | Tray3 | — |
| | | Tray3 | | | Tray1 | Tray2 | — |
| 3053(3050) | Sort | On | CheckBox | — | Off | — | — |
| | | Off | | | On | — | — |
| 3054(3050) | Document Orientation | vertical | RadioButton | — | horizontal | — | — |
| | | horizontal | | | vertical | — | — |
| 3055(3050) | Perfect Binding Setting | On | CheckBox + Button | CheckPerfect Bind | Off(CheckBox) | — | — |
| 3056(3050) | Finisher | None | ComboBox | — | None | — | — |
| | | FS-521 | | | None | — | — |
| | ... | ... | ... | ... | ... | ... | ... |

| CONTROL TYPE | ACTION OF PROHIBIT PROCESS | COMMAND TYPE NO. |
|---|---|---|
| CheckBox + ComboBox | CHANGE <Item(m+n)><br>FROM <Item(m+n)-value><br>TO <Item(m+n)-Recover value> | 1 |
| CheckBox | | |
| CheckBox + Button | | |
| ComboBox | | |
| RadioButton | | |
| Button | GRAY OUT TargetItem | 2 |

| CONTROL TYPE | ACTION OF PROHIBIT PROCESS | COMMAND TYPE NO. |
|---|---|---|
| CheckBox + ComboBox | CHANGE ⟨Item(m+n)⟩ FROM ⟨Item(m+n)-value⟩ TO ⟨Item(m+n)-Recover value⟩, AND HIDE ⟨Item(m+n)-value⟩ Combo Box value ON UI | 3 |
| CheckBox | CHANGE ⟨Item(m+n)⟩ FROM ⟨Item(m+n)-value⟩ TO ⟨Item(m+n)-Recover value⟩, AND HIDE ⟨Item(m+n)-value⟩ value ON UI | 4 |
| CheckBox + Button ComboBox RadioButton Button | CHANGE ⟨Item(m+n)⟩ FROM ⟨Item(m+n)-value⟩ TO ⟨Item(m+n)-Recover value⟩, AND GRAY OUT ⟨Item(m+n)-value⟩ value ON UI | 5 | ism # DETECTION DEVICE FOR PROHIBITED RELATIONSHIP AMONG SETTING VALUES

The present U.S. patent application claims a priority under the Paris Convention of Japanese patent application No. 2016-136880 filed on Jul. 11, 2016, including description, claims, drawings, and abstract, the entire disclosure is incorporated herein by references.

BACKGROUND

Technological Field

This invention relates to a prohibited relationship detection device and a control program for a prohibited relationship detection device. More specifically, this invention relates to a prohibited relationship detection device and a control program for a prohibited relationship detection device which can improve convenience.

Description of the Related Art

As electrophotography image forming apparatuses, there are an MFP (Multi Function Peripheral) having a scanner function, a facsimile function, a copying function, a function of a printer, a data transmitting function and a server function, a facsimile device, a copying machine, a printer, and so on.

As performance of an image forming apparatus is improved, items to be configured when executing a process on the image forming apparatus increased. Further, the range of number and options to be able to be configured on one item increased.

As such the increasing, for conditions related to a job, a configuration in which a value is set for one item and a value is set for another item may be prohibited. A configuration in which specified values are set for 3 or more configurations may be prohibited. The relationship between values for which the configuration is prohibited is called as a prohibited relationship.

The below Document 1 discloses technique which relates to a prohibited relationship. According to this technique, the image forming apparatus finds a function which has a prohibited relationship with a function of which the configuration is changing. When there is a function which has the prohibited relationship, the function which has the prohibited relationship is displayed with alert warning for the error, to show the user the function which has the prohibited relationship exists and urge the user to resolve the problem. When the prohibited relationship was resolved, the configuration is applied to the printing.

DOCUMENT(S)

Document(s) Related to Patent(s)

[Document 1] Japan Patent Publication No. 2014-232503

Traditionally, in a structure in which configurations for a job to be executed on an image forming apparatus are set on a terminal device, the terminal device generates a prohibition table for the driver, based on the prohibition specifications (the engine prohibition table) of the image forming apparatus, and detects the presence or absence of a prohibited relationship among setting values included the job, based on the prohibition table for the driver.

However, the prohibition specifications of an image forming apparatus are normally prescribed in a language used at the image forming apparatus side, such as PJL (Printer Job Language). Hence, according to the conventional structure, the terminal device should detect a prohibited relationship after converting the setting values included in a job into such the language (after the PJL generation process). Therefore, since time from when the job is configured to when a prohibited relationship is detected is required, convenience for users who configure jobs is not good.

SUMMARY

This invention is to solve the above problems, and the object is to provide a prohibited relationship detection device and a control program for the prohibited relationship detection device which can improve convenience.

To achieve at least one of the abovementioned objects, according to an aspect of the present invention, a prohibited relationship detection device reflecting one aspect of the present invention is to detect a prohibited relationship among a plurality of setting values related to job conditions, wherein the prohibited relationship indicates relationship which is prohibited from being applied simultaneously on a device which performs jobs, comprising: a first storage unit to store an index table to classify a plurality of configuration items of which input of a setting value is received on the prohibited relationship detection device into a plurality of resolve tables, a second storage unit to store the plurality of resolve tables which indicate relationship between setting values of which input is received on the prohibited relationship detection device and job language setting values, wherein the job language setting values indicate the setting values of which input is received on the prohibited relationship detection device in a language used at a side of the device which performs jobs, a third storage unit to store a prohibition table which indicates a combination of setting values of which input is received on the prohibited relationship detection device having a prohibited relationship, a receiving unit to receive change of a setting value which relates to the job condition, and a hardware processor configured to detect presence or absence of a prohibited relationship between the setting value of which the change was received on the receiving unit and other setting values configured on the prohibited relationship detection device, based on the index table, the resolve tables and the prohibition table, when the change was received by the receiving unit.

According to another aspect of the invention, a non-transitory computer-readable recording medium storing a controlling program for a prohibited relationship detection device to detect a prohibited relationship among a plurality of setting values related to job conditions, wherein the prohibited relationship indicates relationship which is prohibited from being applied simultaneously on a device which performs jobs, wherein the prohibited relationship detection device comprises: a first storage unit to store an index table to classify a plurality of configuration items of which input of a setting value is received on the prohibited relationship detection device into a plurality of resolve tables, a second storage unit to store the plurality of resolve tables which indicate relationship between setting values of which input is received on the prohibited relationship detection device and job language setting values, wherein the job language setting values indicates the setting values of which input is received on the prohibited relationship detection device in a language used at a side of the device which performs jobs, and a third storage unit to store a prohibition table which indicates a combination of setting values of which input is received on the prohibited relationship detection device having a prohibited relationship, and the program causing a computer to execute the steps of: receiving change of a setting value which relates to the job condition, and detecting presence or absence of a prohibited relationship between the setting value of which change was received and other setting values configured on the prohibited relationship detection device, based on the index table, the resolve tables and the prohibition table, when the change was received.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 shows an example of PJL index table 1051.

FIG. 7 shows an example of resolve PJL table 1521.

FIG. 8 shows an example of resolve PJL table 1522.

FIG. 9 shows an example of resolve PJL table 1523.

FIG. 10 shows an example of resolve PJL table 1524.

FIG. 11 shows an example of resolve PJL table 1525.

FIG. 12 shows an example of resolve PJL table 1526.

FIG. 18 shows an example of the main body prohibition table.

FIG. 21 shows an example of an inter resolve PJL table prohibition table.

FIG. 28 shows an example of prohibition group table 3141.

FIG. 29 shows an example of priority dictionary table 3142.

FIG. 30 shows an example of attribute dictionary table 3143.

FIG. 32 shows an example of the first prohibition process table 3144.

FIG. 33 shows an example of the second prohibition process table 3145.

DETAILED DESCRIPTION OF EMBODIMENTS

Hereinafter, one or more embodiments of the present invention will be described with reference to the drawings. However, the scope of the invention is not limited to the disclosed embodiments. In the followings, the embodiments of this invention will be explained based on the Figures.

The Structure of the Print System

Firstly, the structure of the print system will be explained.

Figure 1:
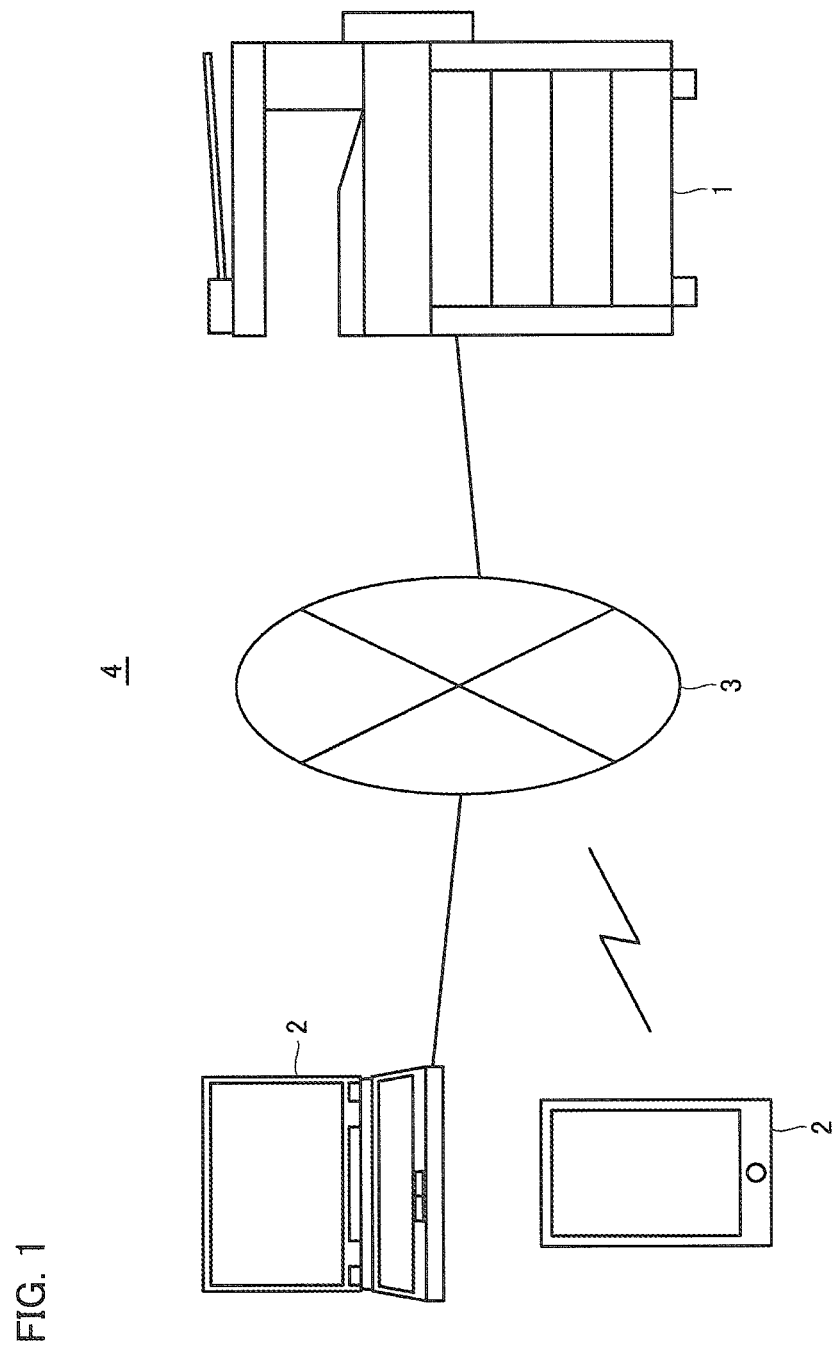
FIG. 1 shows an example of an overall structure of print system 4.
Figure 2:
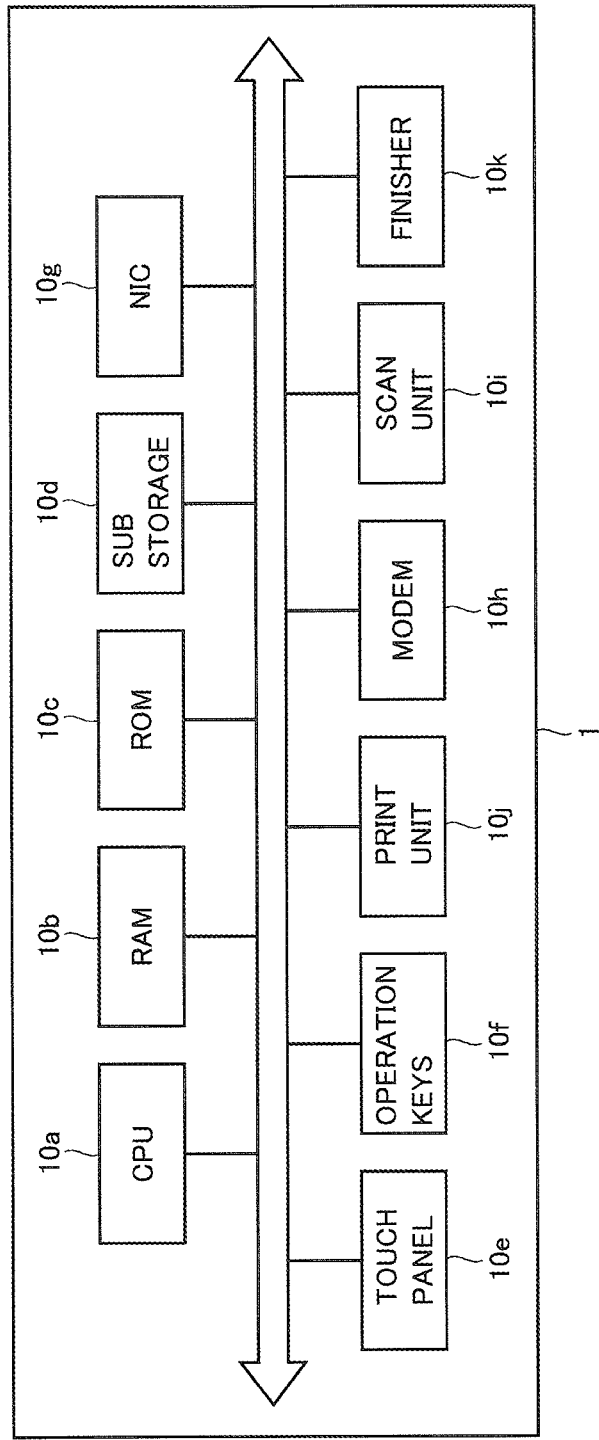
FIG. 2 shows an example of a hardware configuration of image forming apparatus 1.
Figure 3:
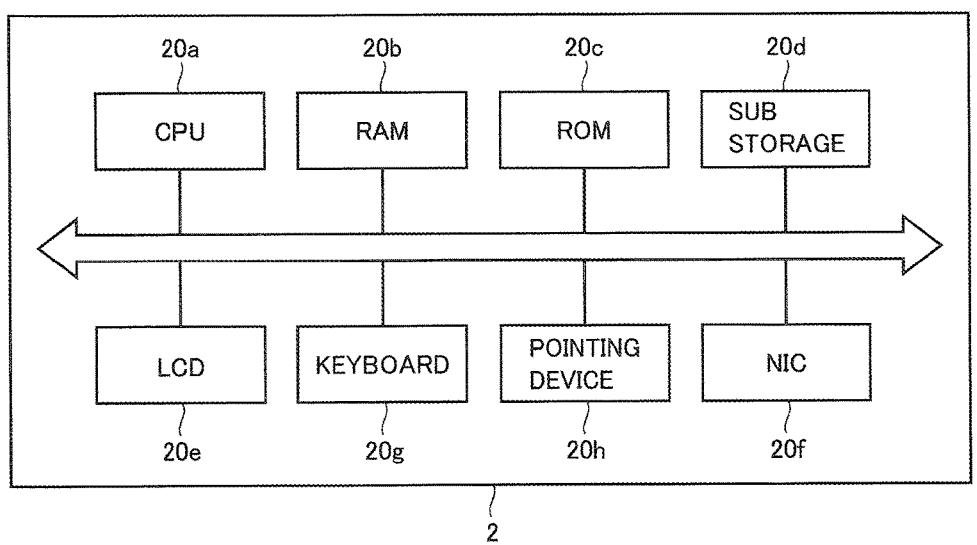
FIG. 3 shows an example of a hardware configuration of terminal device 2.

FIG. 1 shows an example of an overall structure of print system 4. FIG. 2 shows an example of a hardware configuration of image forming apparatus 1. FIG. 3 shows an example of a hardware configuration of terminal device 2.

As shown in FIG. 1, print system 4 is configured with image forming apparatus 1, one or more terminal devices 2, communication line 3, and so on.

According to print system 4, a user can make printed papers by printing documents of which the data is prepared in terminal device 2 (an example of a prohibited relationship detection device) onto sheets, at image forming apparatus 1 (an example of a device which executes a job).

Image forming apparatus 1 and each of terminal devices 2 are connected with each other via communication line 3. As communication line 3, a LAN (Local Area Network) line, Internet, a public line, a dedicated line, or the like is used.

Image forming apparatus 1 is a device in which functions such as copy, network print, fax, scan, box, and so on are aggregated. Image forming apparatus 1 may be generally referred to as "a multifunction machine", "an MFP", or the like.

The function of network print is to print images on sheets, based on image data received from terminal device 2. It may be referred to as "network printing", "PC print", or the like.

The function of box is a service to give a storing area referred to as "a box", "a personal box", or the like to each of users, wherein each of the users stores image data or the like in his/her storing area to administrate it. The box corresponds to "a folder" or "a directory" in a personal computer.

As shown in FIG. 2, image forming apparatus 1 is configured with CPU (Central Processing Unit) 10a, RAM (Random Access Memory) 10b, ROM (Read Only Memory) 10c, subsidiary storage device 10d, touch panel display 10e, operation key panel 10f, NIC (Network Interface Card) 10g, modem 10h, scan unit 10i, print unit 10j, finisher 10k, and so on.

Touch panel display 10e displays a screen showing messages with respect to a user, a screen in which a user inputs commands or information, a screen showing the result of processes executed by CPU 10a, and so on. Touch panel display 10e sends signals indicating the touched location to CPU 10a.

Operation key panel 10f is a so-called hardware keyboard which is configured with a numerical keypad, a start key, a stop key, function keys, and so on.

NIC 10g performs communication with terminal device 2 by using a protocol such as TCP/IP (Transmission Control Protocol/Internet Protocol).

Modem 10h sends and receives image data with fax terminals, by using a protocol such as G3.

Scan unit 10i reads images described on a sheet being set on a platen glass to generate image data.

Print unit 10j prints images read by scan unit 10i. Further, print unit 10j prints images on sheets, based on data received by NIC 10g from terminal device 2. Further, print unit 10j prints images on sheets, based on data received by modem 10h from fax terminals.

Finisher 10k executes finishing processes on printed papers which are document sheets printed by print unit 10j.

More specifically, finisher 10k is configured with a stapling device, a punching device, a paper folding device, and so on. Finisher 10k executes one or more processes among a process to staple printed papers by using the stapling device, a process to punch sheets for making punching holes, and a process to fold sheets, as finishing processes.

Programs to provide the above mentioned functions are stored in ROM 10c or subsidiary storage device 10d. The programs are loaded into RAM 10b as needed basis, and executed by CPU 10a. As subsidiary storage device 10d, a hard disk, an SSD (Solid State Drive), or the like is used.

Terminal devices 2 are clients on which the user receives service to print documents from image forming apparatus 1. As terminal device 2, a personal computer, a tablet computer, a smart phone, or the like is used. In the followings, a case in which a personal computer is used as terminal device 2 will be explained.

As shown by FIG. 3, terminal device 2 is configured with CPU 20a, RAM 20b, ROM 20c, subsidiary storage device 20d, liquid crystal display 20e, NIC 20f, keyboard 20g, pointing device 20h, and so on.

On liquid crystal display 20e, a screen for documents to be printed, a screen for printing instructions, or the like is displayed.

NIC 20f performs communication with image forming apparatus 1 or the like by using a protocol such as TCP/IP.

Keyboard 20g and pointing device 20h are used so that a user inputs information and commands.

In ROM 20c or subsidiary storage device 20d, an operating system and various sorts of applications are stored. The programs are loaded into RAM 20b as needed basis, and executed by CPU 20a. As subsidiary storage device 20d, a hard disk, an SSD, or the like is used.

The Behavior of the Terminal Device When a Network Print Job is Executed

Next, the behavior of the terminal device 2 when a network print job is executed will be explained.

Figure 4:
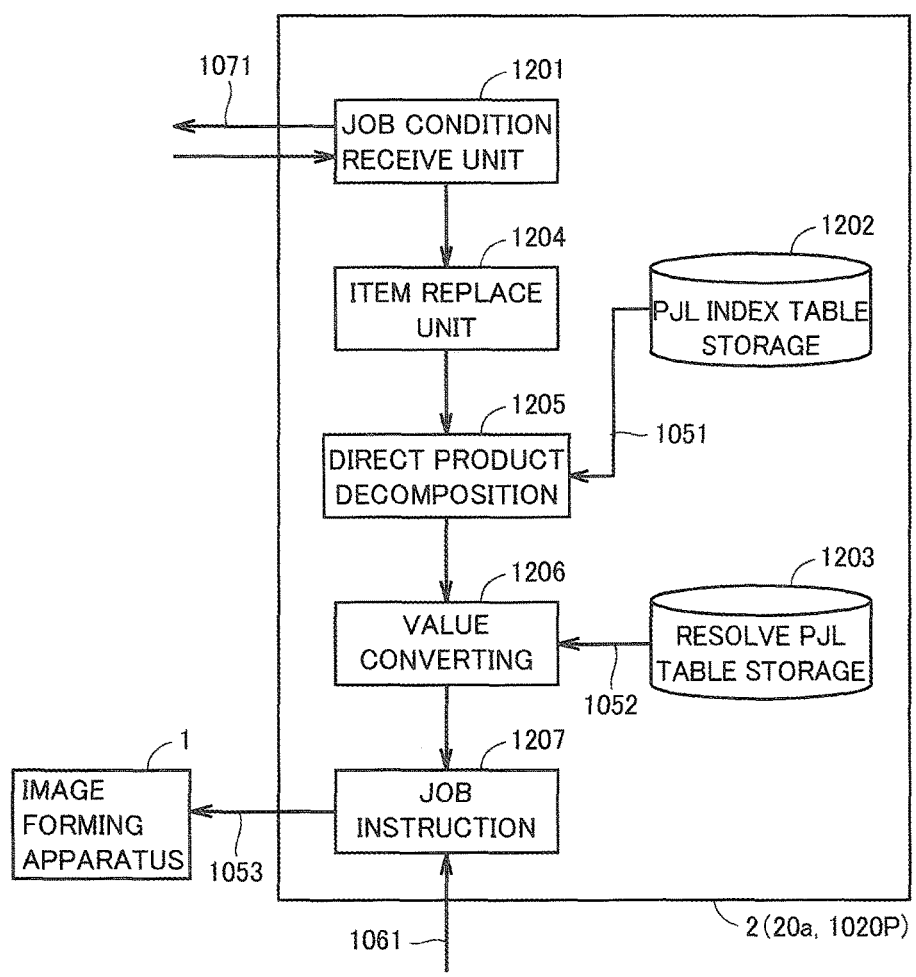
FIG. 4 shows an example of a functional structure relates to a network print job of terminal device 2.

FIG. 4 shows an example of a functional structure relates to a network print job of terminal device 2.

Referring to FIG. 4, printer driver 1020P is stored in ROM 20c or subsidiary storage device 20d. Printer driver 1020P is a program for making image forming apparatus 1 execute a network print job. A network print job is to print documents of which the data is prepared in terminal device 2 on sheets, and appropriately perform finishing processes on the acquired printed papers.

By the printer driver 1020P, the functions as shown by FIG. 4, such as job condition receiving unit 1201, PJL index table storage unit 1202, resolve PJL table storage unit 1203, item replace unit 1204, direct product decomposition unit 1205, value converting unit 1206, and job instruction unit 1207 are realized on terminal device 2. The printer driver 1020P is loaded onto RAM 20b, and executed by CPU 20a.

In the followings, job condition receiving unit 1201 and job instruction unit 1207 will be explained. In addition, an operation by a user on terminal device 2 will be explained.

Figure 5:
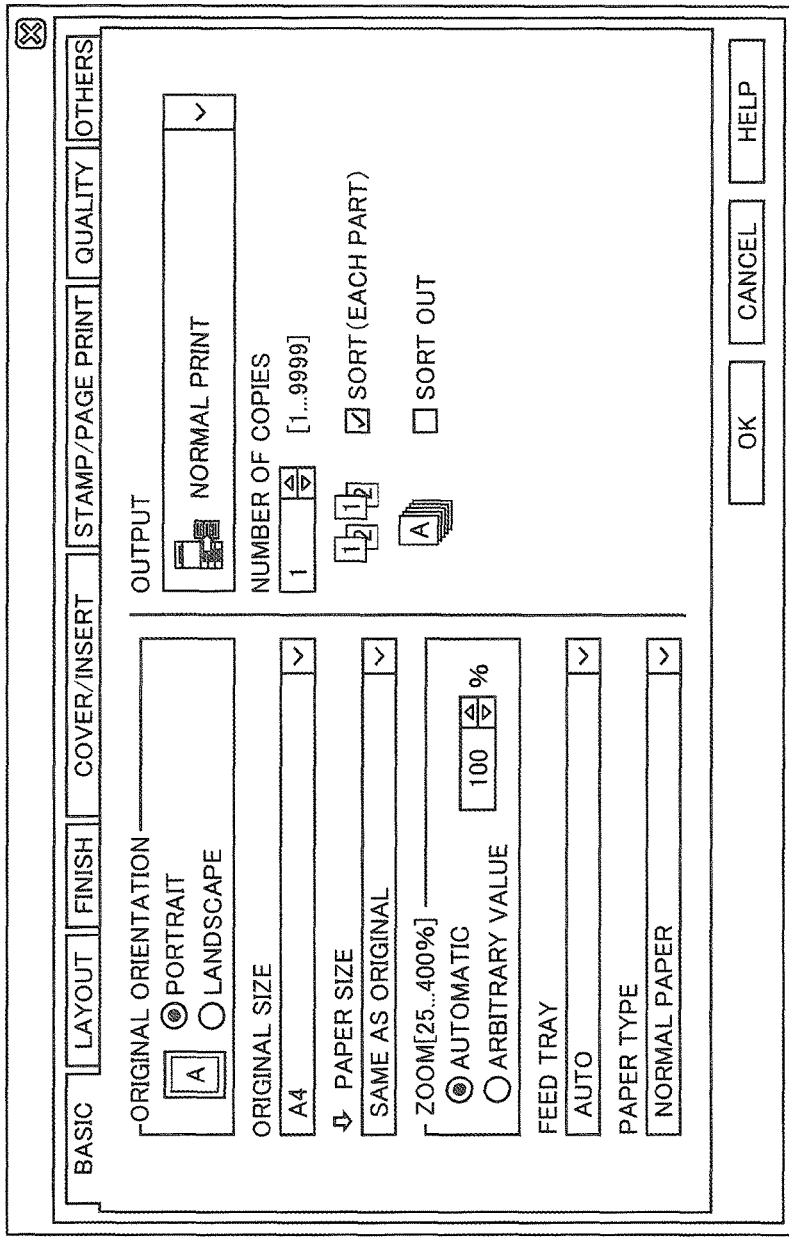
FIG. 5 shows an example of dialog box 1071.
Figure 13:
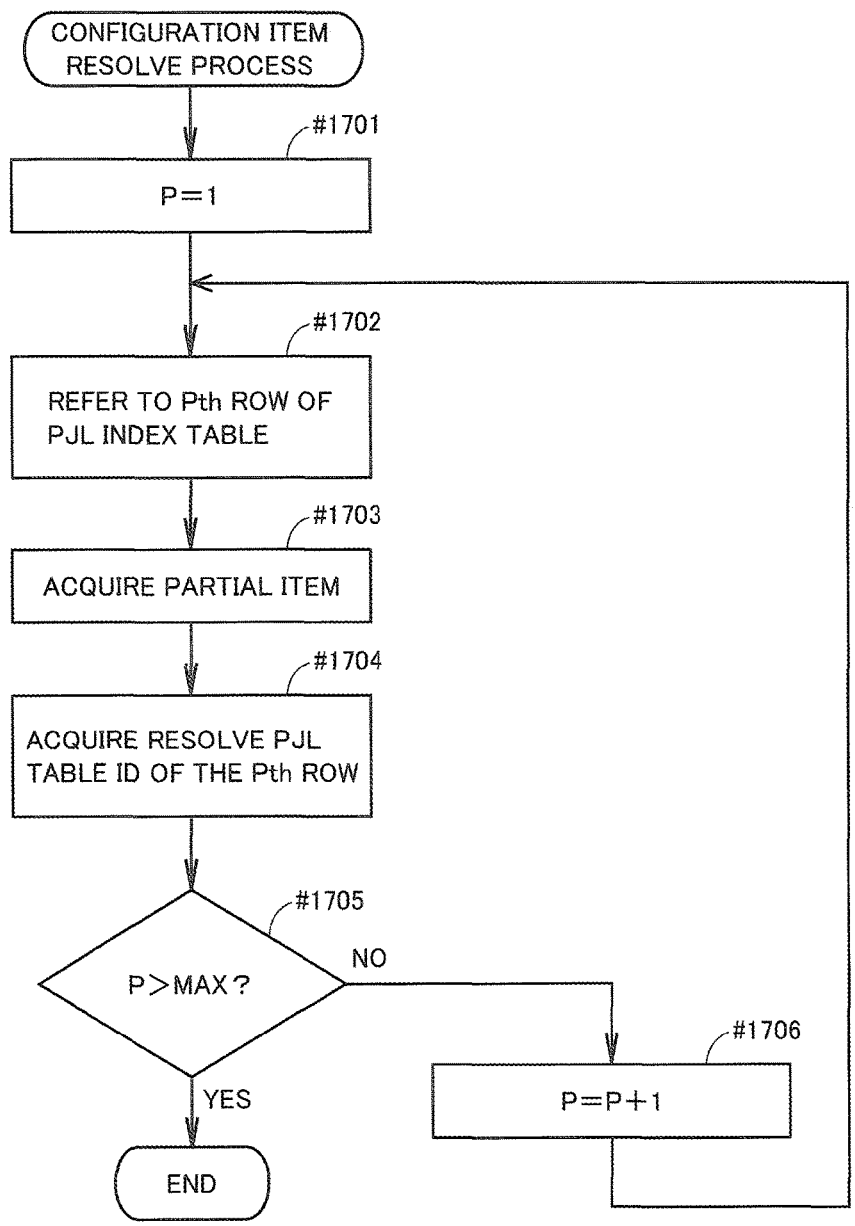
FIG. 13 shows a flowchart to explain an example of the flow of the configuration item resolve processing.
Figure 14:
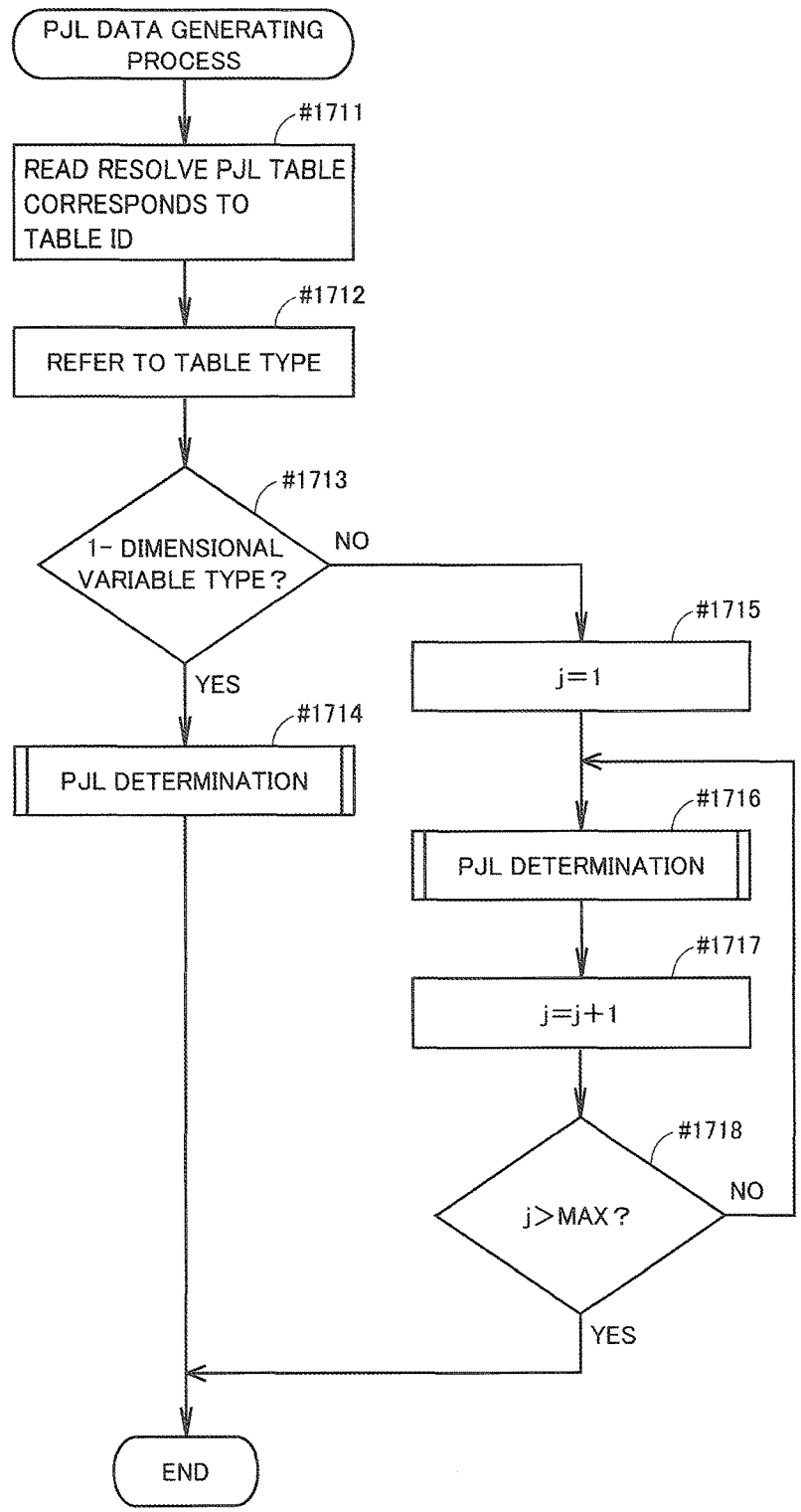
FIG. 14 shows a flowchart to explain an example of the flow of the PJL data generating processing.
Figure 15:
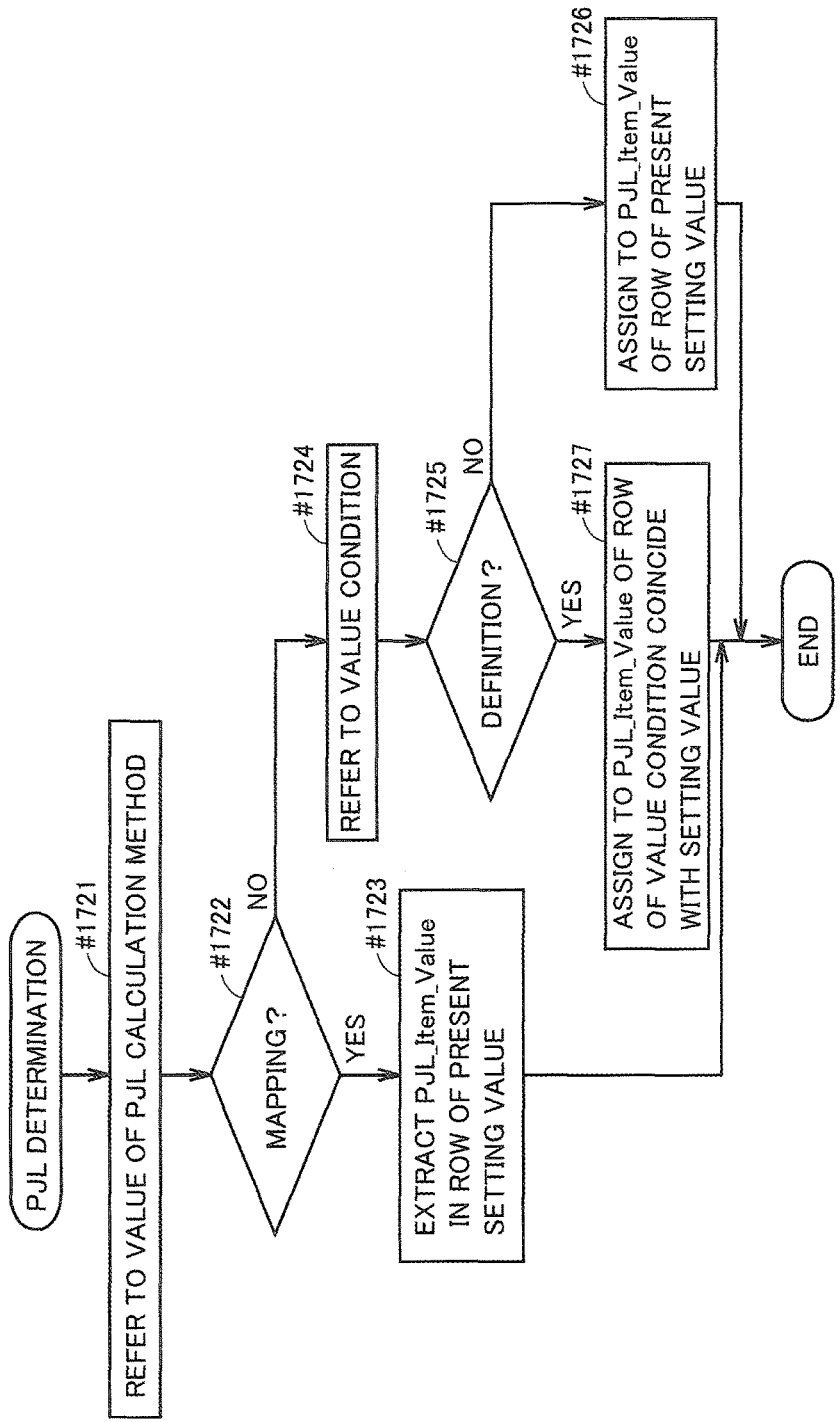
FIG. 15 shows a flowchart to explain an example of the flow of the PJL determining processing.

FIG. 5 shows an example of dialog box 1071. FIG. 6 shows an example of PJL index table 1051. FIG. 7 shows an example of resolve PJL table 1521. FIG. 8 shows an example of resolve PJL table 1522. FIG. 9 shows an example of resolve PJL table 1523. FIG. 10 shows an example of resolve PJL table 1524. FIG. 11 shows an example of resolve PJL table 1525. FIG. 12 shows an example of resolve PJL table 1526. FIG. 13 shows a flowchart to explain an example of the flow of the configuration item resolve processing. FIG. 14 shows a flowchart to explain an example of the flow of the PJL data generating processing. FIG. 15 shows a flowchart to explain an example of the flow of the PJL determining processing.

Job condition receiving unit 1201 executes a process for acquiring conditions of a network print job, as follows for example.

A user prepares a document file 1061 in terminal device 2. A use may prepare a document by generating it by using a word processing software or a drawing software. A use may download a document file from Internet, and use the file as file 1061.

The user opens the file 1061 on an application. In the state, the user inputs predetermined commands on terminal device 2.

Then, job condition receiving unit 1201 displays the dialog box 1071 of FIG. 5 on liquid crystal display 20e. The dialog box 1071 is a screen for configuration of setting values (values of conditions) for various sorts of configuration items of a network print job. In a state in which no operation was performed on dialog box 1071, default setting values are configured.

In the state exemplified by FIG. 5, a user can configure values of conditions only for some items. Other items can be configured by tapping the tab for switching.

The user configures the values of the conditions for each of items by performing operations on dialog box 1071.

Job condition receiving unit 1201 receives the configured values. In the followings, the received values are referred to as "setting values". Items to be configured for a network print job are referred to as "configuration items". Setting values for each of the configuration items may be referred to as "B1", "B2", "B3", . . . to distinguish them from each other.

The setting values of each of the configuration items acquired by job condition receiving unit 1201 can be expressed by the direct product. For example, when number of the configuration items is "n", it can be expressed by the direct product as B1*B2* . . . *Bn.

A setting value may be a one-dimensional value, or a multidimensional value. For example, when the configuration item is "sheet size" (sheet size for a sheet on which a document is to be printed), the setting value takes a one-dimensional value such as "A3 size", "B4 size", or "A4 size".

For a printer driver which can configure different condition values (setting values) of a plurality of configuration items for each page, a large configuration item (a group type configuration item in which a plurality of detailed configuration items are gathered) named as "page unit configuration" may be prepared. In this instance, the matrix such as:

$$\begin{pmatrix} 1\text{-}4 & \text{BOTH SIDES} & \text{TRAY1} & \text{A4} & \text{ON} \\ 5\text{-}10 & \text{ONE SIDE} & \text{TRAY2} & \text{A3} & \text{OFF} \end{pmatrix} \quad (1)$$

is used as the setting value. The components of rows are the setting values (conditions) for the detailed configuration items of the page range, the print types, the paper feeding tray, the sheet size, and the stapling, in order from the left. The detailed configuration items which constitute the large configuration item may be referred to as "structure items".

For example, "1-4 both sides tray 1 A4 ON " in the first row shows the conditions to print the first page to the fourth page of the document on both sides of A4 size sheets stored in tray 1, and staple the sheets.

"5-10 one side tray 3 A3 OFF" in the second row shows the condition to print the fifth page to the tenth page of the document on one side of A3 size sheets stored in tray 3, and not to staple the sheets.

PJL index table storage unit 1202 stores PJL index table 1051 (an example of an index table).

PJL index table 1051 is to classify a plurality of configuration items of which the inputs of the setting values are received on terminal device 2, into a plurality of resolve PJL tables 1052 (examples of resolve tables). In PJL index table 1051, a piece of index data 1051a for each direct product which consists of at least one of the setting values which constitute the above mentioned direct product of B1* B2* . . . (hereinafter, it is referred to as a "partial direct product".) is stored.

For example, PJL index table 1051 shown by FIG. 6 is stored in PJL index table storage unit 1202, as the PJL index table 1051 for B1*B2* . . . *B9.

PJL index table 1051 is mainly used for resolving a direct product into a plurality of partial direct products. This will be explained later.

In index data 1051a, configuration items which constitute the corresponding partial direct products (it is referred to as "items") are indicated as "SetItem1", "SetItem2", . . . . In index data 1051a, the data type for each of items are indicated. As the data types, there are the value selection, the value, the character string (string), the binary, and so on.

In index data 1051a, identifiers to identify resolve PJL table 1052 used for converting the partial direct product to a value of the PJL. In the followings, a value of the PJL is referred to as a "PJL value", and the identifier of resolve PJL table 1052 is referred to as a "resolve PJL table ID".

A developer decides the contents of PJL index table 1051, depending on specifications of printer driver 1020P and PJL. An administrator or a developer appropriately updates PJL index table 1051 in response to change of specifications or the maintenance of image forming apparatus 1.

In resolve PJL table storage unit 1203, a plurality of resolve PJL tables 1052 as shown in FIG. 7 to FIG. 12 are stored. In the followings, resolve PJL tables 1052 may be referred to as "resolve PJL table 1521", "resolve PJL table 1522", . . . to distinguish from each other.

Resolve PJL table 1052 shows the relationship between a setting value of which the input is received on terminal device 2, and the PJL value in which the setting value of which the input is received on terminal device 2 is expressed in PJL. Resolve PJL table 1052 is used to convert a partial direct product to the PJL value. Resolve PJL table is also used when an inter resolve PJL table prohibition table is generated based on the main body prohibition table. The usage of them will be explained later.

In resolve PJL table 1052, a resolve PJL table ID (an example of a resolve table ID), resolve PJL table inner index (an example of a resolve table inner index), table type, and PJL calculation method are indicated. As mentioned above, the resolve PJL table ID is the identifier for resolve PJL table 1052.

The resolve PJL table inner index is the identifier corresponding to each of the setting values included in the resolve PJL table.

The table type shows a type of resolve PJL table 1052. As the table type, "one-dimensional converting type" or "indexed type" is indicated.

The one-dimensional converting type means to be used to convert a one-dimensional value (one value or the matrix of 1*t) to the PJL value. On the other hand, the indexed type means to be used to convert setting values which are the s*t matrix to the PJL values. The "s" and the "t" are integers which are more than or equal to 2. If there is a configuration item of setting values which are the s*t matrix among the configuration items of resolve PJL table 1052, it is an indexed table type.

The PJL calculation method is the way to convert setting values to the PJL values. As the PJL calculation method, one of "mapping" and "calculation" is indicated.

The mapping is a method to select a value corresponding to the setting value among a plurality of values prepared as options, to convert it to the PJL value.

On the other hand, the calculation is a method to assign the setting value to a prepared mathematical formula (a function) and calculate it, to convert it to the PJL value.

Further, in resolve PJL table 1052, input information and output information are indicated. The input information includes the setting value, or one or more configuration item information sets to calculate the setting value.

On the other hand, the output information includes the PJL value, or one or more PJL item information sets to calculate the PJL value.

The pieces of the input information and the pieces of the output information correspond to each other. More specifically, the input information and the output information indicate the same condition values, or they approximate.

In a case that the PJL calculation method shows mapping, resolve PJL table 1052 includes at least one of configuration item information sets having a plurality of pairs of SetItem_x and SetItem_x_Value, in the input information. The pair indicates the requirement in which "the value of the SetItem_x is the SetItem_x_Value". The "x" is a sequence number, and takes values of "1", "2", . . . for each configuration item information.

On the other hand, the output information includes at least one of the PJL item information sets having a plurality of pairs of PJL_Item_y and PJL_Item_y_Value. In a case that the above mentioned requirement on the same row is satisfied, the pair shows the PJL_Item_y is the PJL_Item_y_Value. When there are a plurality of pieces of the configuration item information, the PJL_Item_y is the PJL_Item_y_Value only when all the requirements on the same row are satisfied. The PJL_Item_y is the PJL value of the PJL item. The "y" is a sequence number, and takes values of "1", "2", . . . for each PJL item information.

In this manner, the combination of setting values shown by all the configuration item information corresponds to the combination of setting values shown by all the PJL item information, in the same row. More specifically, they are the same condition values, or they approximate.

For example, in resolve PJL table 1521 (See FIG. 7), 2 sets of the configuration item information are included in the input information. One set of PJL item information is included in the output information. There are two rows.

On the first row, when B1 is "b11" and B2 is "b21", it means that A1 corresponds to "a11" (A1 is equal to "a11", or they approximate). The A1 is a value of a predetermined item of PJL (the PJL value). A2, A3, A4_1, A4_2, . . . which will be explained later are similar to it.

Similarly, on the second row, when B1 is "b12" and B2 is "b22", it means that A1 corresponds to "a12".

Or, in resolve PJL table 1525 (See FIG. 11), two sets of the configuration item information are included in the input information. Two sets of PJL item information are included in the output information. There are three rows.

On the first row, when B7_2 is "b71" and B9 is "b91", it means that A5_1 corresponds to "a51" and A5_2 corresponds to "a53". On the second row, when B7_2 is "b72" and B9 is "b92", it means that A5_1 corresponds to "a52" and A5_2 corresponds to "a53". On the third row, when B7_2 is "b73" and B9 is "b93", it means that A5_1 corresponds to "a51" and A5_2 corresponds to "a54".

Or, when the PJL calculation method shows calculation, resolve PJL table 1052 includes at least one of the configuration item information sets having a pair of SetItem_x and the data type in the input information. Or, it includes at least one of the configuration item information sets having a combination of SetItem_x, the data type, and the value condition.

The data type indicates the type of SetItem_x. When the PJL calculation method is calculation, value, character string, binary, or the like is indicated as the data type. When the PJL calculation method is mapping, "value select" is indicated.

The value condition is a condition which includes SetItem_x, which is used with the output information which will be explained later.

On the other hand, the output information includes at least one of PJL item information sets having one or more pairs of PJL_Item_y and PJL_Item_y_Value. The meaning of the pair is basically similar to the mapping. However, a fixed value is not assigned to PJL_Item_y_Value. A mathematical formula in which SetItem_x is variable is assigned to PJL_Item_y_Value. More specifically, a function of PJL_Item_y=PJL_Item_y_Value wherein the SetItem_x is a variable is indicated by PJL_Item_y and PJL_Item_y_Value.

In one piece of the output information, a plurality of PJL_Item_y_Values may be indicated for one PJL_Item_y. In this instance, the same number of value conditions are indicated for any of the configuration item information in the input information. The PJL_Item_y_Value corresponding to the satisfied condition among the value conditions (the PJL_Item_y_Value on the same row) is used for calculating the PJL value.

For example, in resolve PJL table 1522 (See FIG. 8), three pieces of the configuration item information are included in the input information. One piece of the PJL item information is included in the output information. In the three pieces of the configuration item information, there is not a value condition. In the PJL item information, only one function (A2=B4*B5*B3) in which SetItem_x's (B4, B5, and B3) included in the three pieces of the configuration item information are variables is indicated, as the PJL_Item_y_Value.

On the other hand, in resolve PJL table 1523 (See FIG. 9), two pieces of the configuration item information are included in the input information. One piece of the PJL item information is included in the output information. In the one of the two pieces of the configuration item information, two value conditions are specified. In the PJL item information, two functions (A3=B6*B8, and A3=B6*B8*2) corresponding to the two value conditions are specified, as the PJL_Item_y_Value. Each of the functions uses at least one of SetItem_x's (B6, B8) included in the two pieces of the configuration item information as the variable.

The contents of resolve PJL tables 1052 are specified by the developer, in response to specifications of printer driver 1020P and PJL. The resolve PJL tables 1052 are appropriately updated by an administrator, a developer, or the like, in response to changing of the specifications or maintenance of image forming apparatus 1.

When the setting value is the s*t matrix, the rows of the setting value can be indexed as 1, 2, . . . , s in order from the first row. For example, when Bk is such the matrix and has k' components on a row, and the set of the indexes is shown as $$Ik=(1, 2, \ldots) \quad (2),$$

the Bk can be specified by $$Bk=Ik*(Bk\_1*Bk\_2* \ldots *Bk\_k') \quad (3).$$

For example, when the configuration items of Ba are the above mentioned "page unit configuration", k' is "5", and $$Ba=Ia*(Ba\_1*Ba\_2* \ldots *Ba\_5) \quad (4).$$

The Ba_1, Ba_2, Ba_3, Ba_4, and Ba_5 are setting values for the page range, the print types, the paper feeding tray, the sheet size, and the stapling, respectively.

Item replace unit 1204 replaces setting values having a plurality of rows in the direct product (in the followings, it is referred to as the "input direct product") indicating the set of the setting values of each of the configuration items acquired by job condition receiving unit 1201, to the form of the right side of equation (3) shown above.

For example, when the input direct product is B1*B2*B3*B4*B5*B6*B7*B8*B9, wherein the B7 is configured with a plurality of rows, and one of the rows consist of three components (namely, when the B7 is a matrix of s*3), item replace unit 1204 replaces the input direct product to:

$$B1*B2*B3*B4*B5*B6*B7*B8*B9=B1*B2*B3*B4*B5*B6* \\ (I7*B7\_1*B7\_2*B7\_3)*B8*B9 \quad (5),$$

for example, to replace the setting value of a part of the configuration items to setting values of a plurality of structure items.

In this manner, according to item replace unit 1204, a setting value of a part of the configuration items (for example, B7) is divided into a plurality of setting values. The developer beforehand decides which the setting value is to be converted, based on specifications of printer driver 1020P and PJL. Item replace unit 1204 may replace setting values of the matrix of 1*t to the form of the equation (3).

Direct product decomposition unit 1205 resolves the input direct product to a plurality of partial direct products, by a procedure shown in FIG. 13, based on PJL index table 1051 (See FIG. 6) stored in PJL index table storage unit 1202.

Direct product decomposition unit 1205 refers to the first index data 1051a stored in PJL index table 1051 (#1701, #1702).

Direct product decomposition unit 1205 extracts setting values corresponding to items SetItem1, SetItem2, . . . indicated in the referred index data 1051a from the input direct product, to acquire the set which consists of the extracted setting values as the partial direct products (#1703). Further, direct product decomposition unit 1205 acquires the table ID indicated by the index data 1051a (#1704).

Similarly, direct product decomposition unit 1205 refers to the second and the following index data 1051a, and acquires partial direct products based on the referred index data, from the input direct product, to acquire the table ID (#1706, #1702 to #1704).

However, when item replace unit 1204 performed the replacement process on the input direct product, partial direct products are acquired from the input direct product after the replacement.

For example, when the input direct product is replaced by item replace unit 1204 in line with the above mentioned equation (5), and the contents of PJL index table 1051 are as shown by FIG. 6, direct product decomposition unit 1205 resolves it into 5 partial direct products of B1*B2, B4*B5*B3, B6*B8, B7_1*B7_2*B9, and B7_2*B7_3*B8.

By the manner, the plurality of the partial direct products are acquired from the input direct product, to resolve the input direct product into the plurality of the partial direct products.

Value converting unit 1206 executes converting processes to convert setting values of the plurality of partial direct products acquired by direct product decomposition unit 1205 to the PJL values, based on resolve PJL table 1052 stored in resolve PJL table storage unit 1203.

Here, paying attention to a partial direct product, the flow of converting processing in which the setting values of the partial direct product is converted into the PJL values will be explained by referring to FIG. 14. In the followings, the partial direct product of interest is referred to as the "attention partial direct product".

Value converting unit 1206 reads resolve PJL table 1052 corresponding to the table ID acquired by direct product decomposition unit 1205 with the attention partial direct product, from resolve PJL table storage unit 1203 (#1711). In the followings, the read resolve PJL table 1052 is referred to as the "attention resolve PJL table".

Value converting unit 1206 checks the table type indicated by the attention resolve PJL table (#1712).

When the table type is the one-dimensional converting type (YES at #1713), value converting unit 1206 converts the setting value of the attention partial direct product to the PJL values, by the procedure shown in FIG. 15 (#1714). In this instance, the attention partial direct product is one-dimensional. Namely, it has a single value, or it is a matrix of 1*t.

Value converting unit 1206 checks the PJL calculation method indicated in the attention resolve PJL table (#1721 in FIG. 15).

When the PJL calculation method is the mapping (YES at #1722), a row indicated by SetItem_x_Value which is the setting value of the attention partial direct product is selected, among the plurality of rows shown in the attention resolve PJL table, and PJL_Item_y_Value on the row is extracted as a value of PJL_Item_y (Namely, as the PJL value) (#1723).

For example, when the attention resolve PJL table is resolve PJL table 1521 (See FIG. 7), the attention partial direct product is B1*B2, and B1 and B2 are "b12" and "b22" respectively, the value converting unit 1206 selects the second row. Then, "a12" is extracted as A1. Herewith, A1=a12 is determined, so that the attention partial direct product is converted into "a12".

Or, when the PJL calculation method is the calculation (NO at #1722), value converting unit 1206 checks the value condition in the configuration item information of the attention resolve PJL table (#1724).

When a conditional expression as the value condition is not shown in the configuration item information (NO at #1725), value converting unit 1206 plugs in SetItem_x_Values of the configuration item information for PJL_Item_y_Value of the attention resolve PJL table, to calculate PJL_Item_y (#1726).

For example, when the attention resolve PJL table is resolve PJL table 1522 (See FIG. 8), the attention partial direct product is B4*B5*B3, and B4, B5 and B3 are "b49", "b59" and "b3" respectively, and PJL_Item_y_Value is B4*B5*B3, value converting unit 1206 assigns "b49", "b59" and "b3" to PJL_Item_y_Value, to calculate b49*b59*b39, so that the PJL value is acquired. Herewith, the attention partial direct product is converted to the calculation result of b49*b59*b39.

When a conditional expression is specified as the value condition in at least one of pieces of the configuration item information (YES at #1725), value converting unit 1206 plugs in SetItem_x_Values of the configuration item information for PJL_Item_y_Value on the same row of the satisfied conditional expression among the conditional expressions, to calculate PJL_Item_y (#1727).

For example, it is assumed that the attention resolve PJL table is resolve PJL table 1523 (See FIG. 9), the attention partial direct product is B6*B8, B6 and B8 are "97" and "b89" respectively. PJL_Item_y_Value is "B6*B8" when the value condition is "B6<100", and PJL_Item_y_Value is "B6*B8*2" when the value condition is "B6≥100". Since B6<100, value converting unit 1206 assigns "97" and "b89" to B6*B8, to calculate b97*b89, so that the PJL value is acquired. Herewith, the attention partial direct product is converted to the calculation result of b97*b89.

Or, when "B6" is "102", "102" and "b89" are assigned to B6*B8*2, and b97*b89*2 is calculated, to acquire the PJL value. Herewith, the attention partial direct product is converted to the calculation result of b97*b89*2.

When a plurality of pieces of PJL item information are included in the attention resolve PJL table, value converting unit 1206 acquires the PJL values for PJL_Item_y (PJL_Item_1, PJL_Item_2, . . . ) of the pieces of the PJL item information, at steps #1723, #1726, and #1727.

Returning to FIG. 14, when the table type is the indexed type (NO at #1713), value converting unit 1206 pays attention to rows which constitute the attention partial direct product one after another in order from the top, to execute the process shown by FIG. 15 (#1715 to #1717).

For example, when the attention resolve PJL table is resolve PJL table 1525 (See FIG. 11), the attention partial direct product is B7_2*B9, and $$\begin{pmatrix} b72 & b92 \\ b73 & b93 \end{pmatrix},\qquad(2)$$

value converting unit 1206 extracts "a52" as PJL_Item_1_Value of PJL_Item_1 (Namely, the PJL value of A5_1) for the first row of the matrix, and "a53" as PJL_Item_2_Value of PJL_Item_2 (Namely, the PJL value of A5_2) for the first row of the matrix. Further, "a51" and "a54" are extracted as the PJL value of A5_1 and the PJL value of A5_2, respectively, for the second row of the matrix.

Namely, the attention partial direct product is converted to:

$$(A5\_1 \quad A5\_2) = \begin{pmatrix} A52 & A53 \\ A51 & A54 \end{pmatrix} \quad (3)$$

Value converting unit 1206 converts the plurality of partial direct products acquired by direct product decomposition unit 1205 to the PJL values one after another, by the above processes.

According to the above mentioned processes of job condition receiving unit 1201 and value converting unit 1206, the PJL values for items in PJL. For example, the PJL value which can be expressed by a direct product of A1*A2*A2*A3*A4_1*A4_2*A5_1*A5_2*A6, from the input direct product of B1*B2* . . . *B9.

When these partial direct products were converted to the PJL values by direct product decomposition unit 1205, job instruction unit 1207 generates printing data 1053 which shows the PJL values using the file 1061, and transmits it with the instruction of the network print job to image forming apparatus 1. The printing data 1053 is described in the PJL.

When image forming apparatus 1 receives printing data 1053 and the instruction of the network print job, image forming apparatus 1 performs the network print job, based on printing data 1053.

Figure 16:
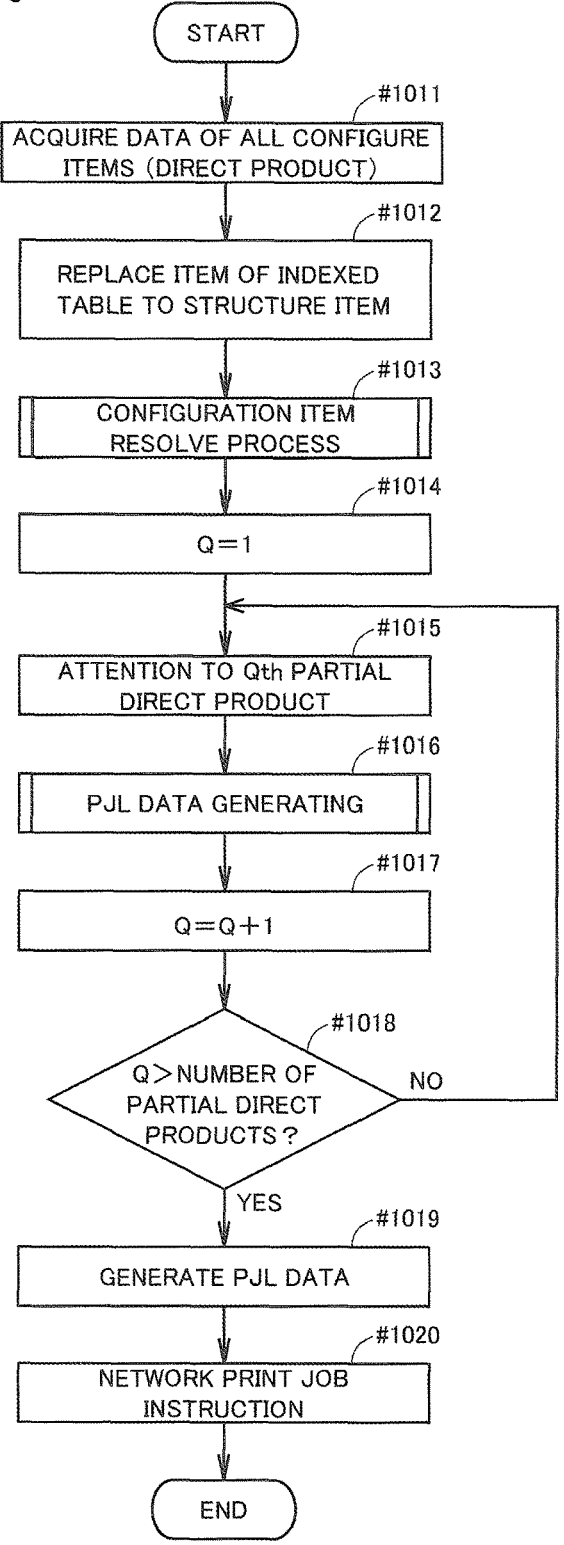
FIG. 16 shows a flowchart to explain an example of overall flow of processing for a network print job by a client.

FIG. 16 shows a flowchart to explain an example of overall flow of processing for a network print job by a client.

Next, an example of overall flow of processing when terminal device 2 makes image forming apparatus 1 execute a network print job will be explained referring to the flowchart.

Terminal device 2 executes a process in accordance with the procedure as shown by FIG. 16. The process is performed based on printer driver 1020P.

When a user inputs predetermined commands in a state in which file 1061 was opened by an application, terminal device 2 displays dialog box 1071 (See FIG. 5), and receives setting values in response to operations the user performed to the dialog box 1071 (#1011). The configuration items on which the user did not input the setting values may be supplemented with default values. The setting values of all the configuration items are expressed by direct products. These direct products are input direct products.

Terminal device 2 replaces part of setting values which constitute the input direct product to setting values of a plurality of the structure items (#1012). For example, an input direct product of B1*B2* . . . *B7*B8*B9 is converted into B1*B2* . . . * (I7*B7_1*B7_2*B7_3)*B8*B9, as equation (5).

Further, terminal device 2 resolves the input direct product to a plurality of partial direct products (#1013). The method for the resolving is as explained above with FIG. 6.

Terminal device 2 pays attention to the plurality of the partial direct products one after another, in order from front to back, and calculates the PJL value corresponding to the partial direct product of attention (the attention partial direct product) (#1014 to #1018). Namely, the attention partial direct product is converted into the PJL value. The method for calculating (converting) the PJL value is as explained above with FIGS. 14 and 16.

Next, terminal device 2 generates printing data 1053 by using the calculated PJL values and file 1061 (#1019), and transmits it to image forming apparatus 1 with the instruction of the network print job (#1020).

The Generation Method of the Prohibited Combination Information

Next, the generation method of the prohibited combination information will be explained.

Image forming apparatus 1 is configured for various sorts of item (option), when the above mentioned function is used. For example, the sheet size configuration, the sheet orientation configuration, and so on are performed, as a configuration related to printing. As a configuration related to finishing on printed papers, the selection of finisher 10*k* which is used for stapling binding, the configuration in which stapling binding is executed or not, the configuration in which punching holes are made or not, the configuration of the location of the punching holes, the configuration of the number of punching holes, the configuration in which folding is executed or not and the folding type when folding is executed, the configuration in which sorting is executed or not, and the configuration of sorting destination are performed.

However, it is not always possible to perform these configurations freely. Namely, when configuring a value (a condition) for an item, a value which can be configured for another item may be limited. In this manner, the relationship among a plurality of setting values for a job, wherein simultaneous application of the plurality of setting values is prohibited on a device which execute the job is referred to as a "prohibited relationship".

A combination having a prohibited relationship is not limited to values of two items. There are cases in which more than 2 items has a prohibited relationship.

In the followings, a group consists of values of a plurality of items in a prohibited relationship is referred to as a "prohibited group". Configuration of values as a group having a prohibited relationship is prohibited.

In image forming apparatus 1, there are many prohibited groups. Image forming apparatus 1 stores the PJL prohibited combination information. The PJL prohibited combination information shows combinations of pieces of PJL item information having prohibited relationships.

Terminal device 2 generates the prohibited combination information based on the PJL prohibited combination information stored in image forming apparatus 1. The prohibited combination information shows combinations having prohibited relationships for setting values of which the input is received at terminal device 2. Terminal device 2 stores the prohibited relationship generating program 2020P to generate the prohibited combination information, in subsidiary storage device 20*d*.

Figure 17:
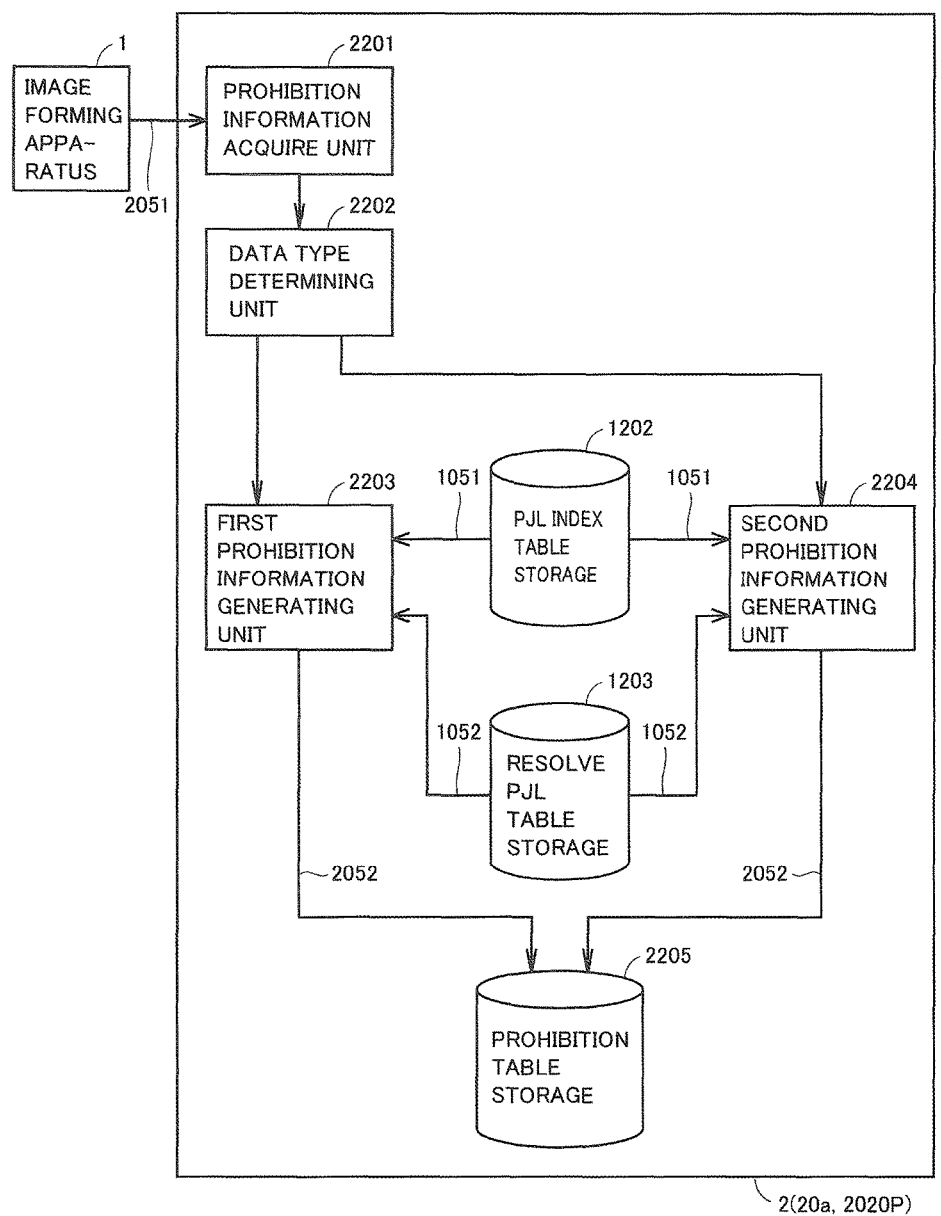
FIG. 17 shows an example of a functional structure relates to generating the prohibited combination information of terminal device 2.
Figure 19:
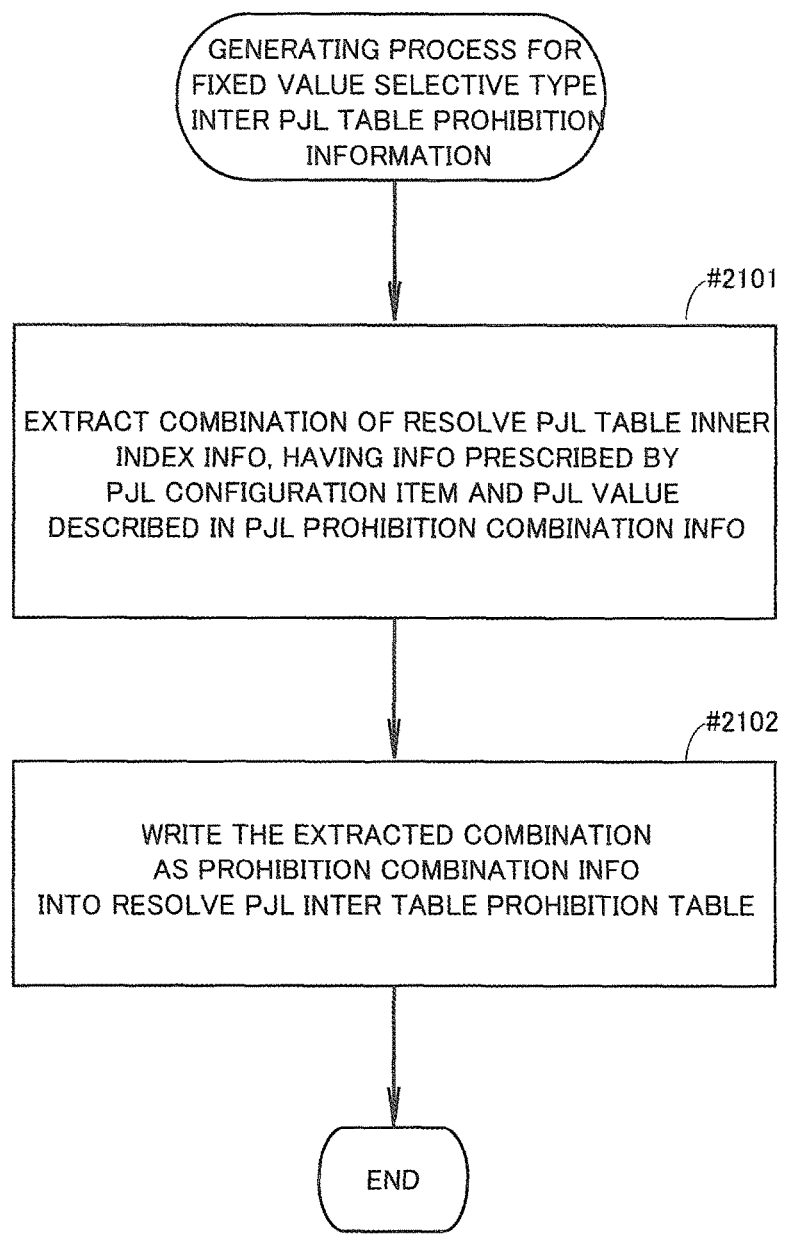
FIG. 19 shows a flowchart showing the generating process for a fixed value selective type inter PJL table prohibition information.
Figure 20:
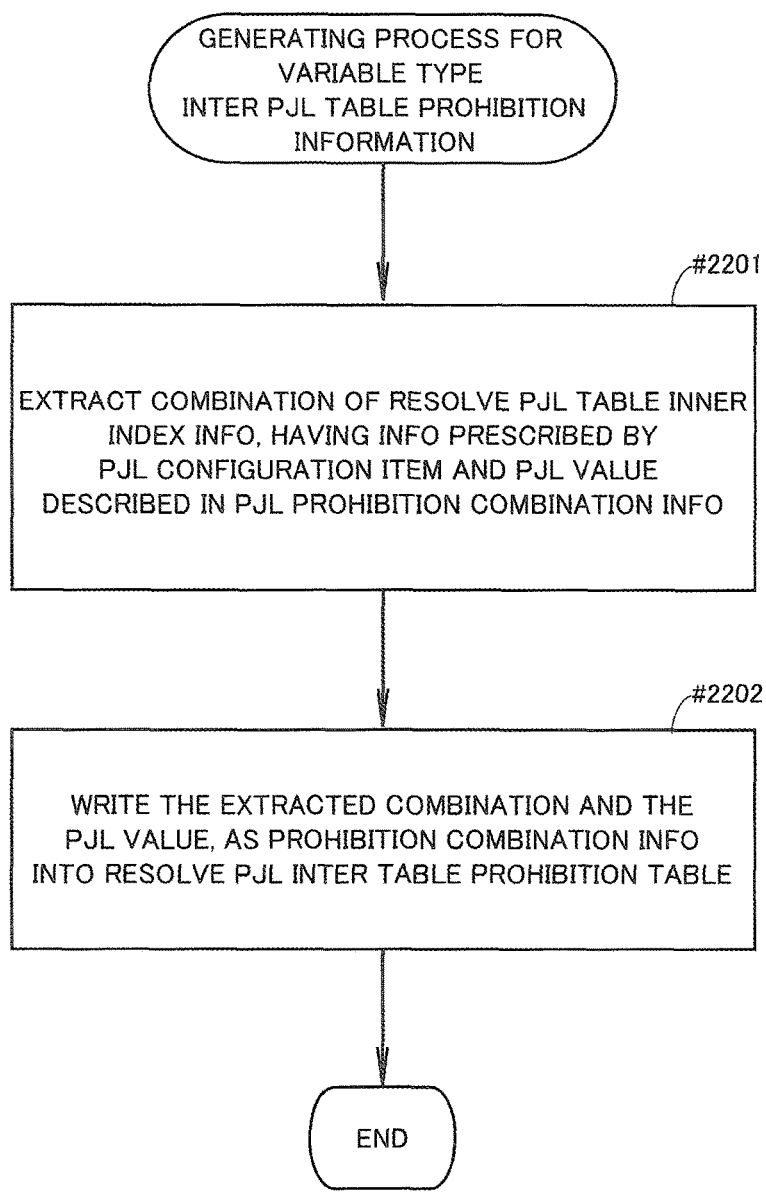
FIG. 20 shows a flowchart showing the generating process for a variable type inter PJL table prohibition information.
Figure 22:
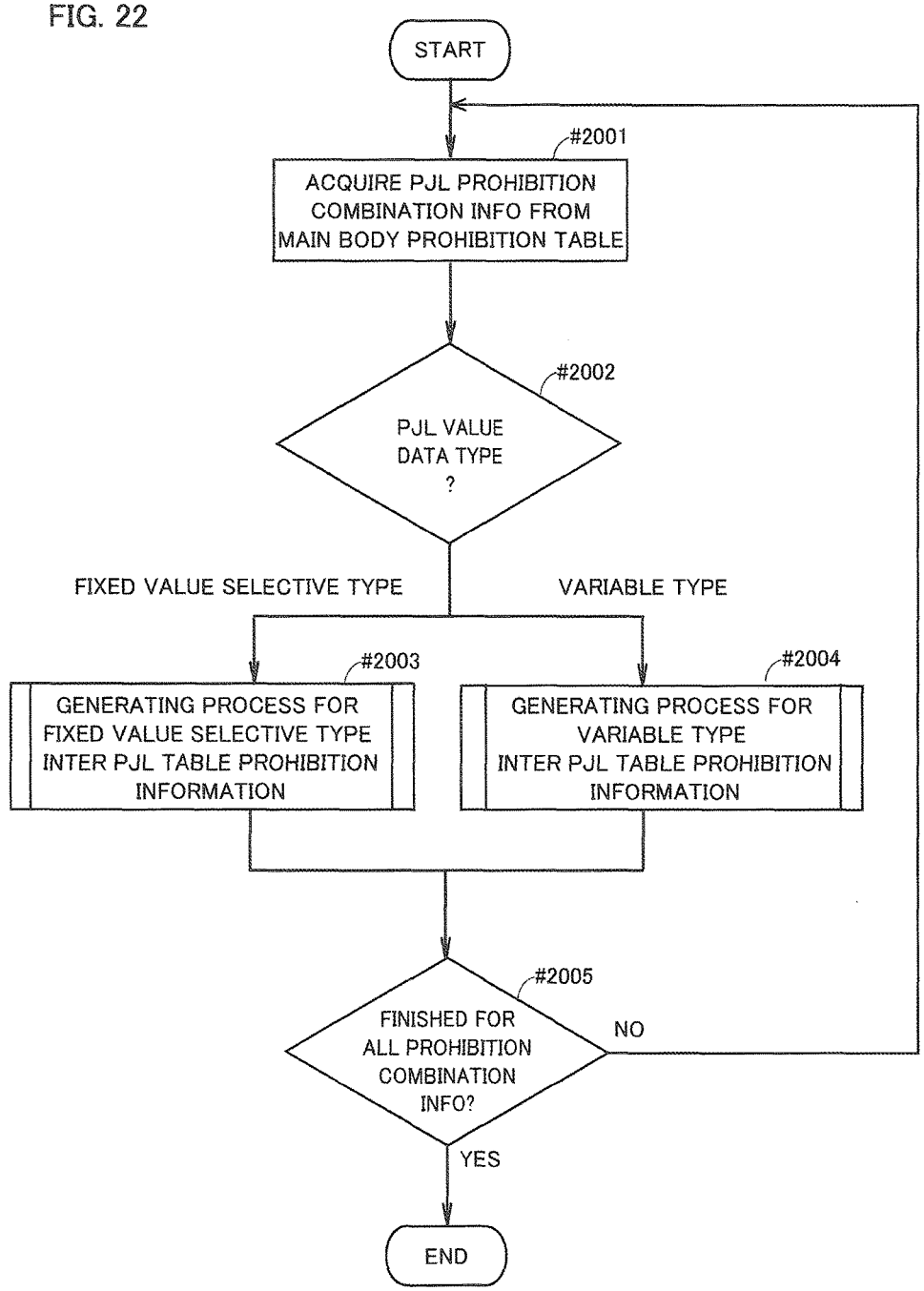
FIG. 22 shows a flowchart for explanation of an example of overall flow of the generating process of the prohibited combination information executed by terminal device 2.

FIG. 17 shows an example of a functional structure relates to generating the prohibited combination information of terminal device 2. FIG. 18 shows an example of the main body prohibition table. FIG. 19 shows a flowchart showing the generating process for a fixed value selective type inter PJL table prohibition information. FIG. 20 shows a flowchart showing the generating process for a variable type inter PJL table prohibition information. FIG. 21 shows an example of an inter resolve PJL table prohibition table. FIG. 22 shows a flowchart for explanation of an example of overall flow of the generating process of the prohibited combination information executed by terminal device 2.

According to the prohibited relationship generating program 2020P, as shown in FIG. 17, the functions of prohibition information acquire unit 2201, data type determining unit 2202, first prohibition information generating unit 2203, second prohibition information generating unit 2204, prohibition table storage unit 2205, and so on are realized on terminal device 2. The prohibited relationship generating program 2020P is loaded into RAM 20b, like other programs as mentioned above, and executed by CPU 20a.

In PJL index table storage unit 1202, PJL index table 1051 shown by FIG. 6 is stored. In resolve PJL table storage unit 1203, resolve PJL tables 1052 as shown by FIGS. 7 to 12 are stored.

Prohibition information acquire unit 2201 acquires the PJL prohibited combination information 2051 described on the main body prohibition table 2151 from image forming apparatus 1 (the main body). Prohibition information acquire unit 2201 may acquire specification documents or the like of image forming apparatus 1 as substitute for the PJL prohibited combination information.

In subsidiary storage device 10d of image forming apparatus 1, the main body prohibition table 2151 shown by FIG. 18 is stored. The main body prohibition table 2151 describes prohibited groups (the prohibition specifications) prescribed by the PJL (an example of language used at the side of a job execution device), as specifications of the side of image forming apparatus 1 (the main body side), and includes a plurality of pieces of the PJL prohibited combination information 2051. It is prohibited relationship information, which includes a plurality of pieces of the PJL item information with a prohibited relationship. Each of pieces of the PJL item information includes "PJL configuration item" ("PJL_Item" in FIG. 18), "data type of the PJL value" ("PJL data type" in FIG. 18), and "the PJL value" ("PJL_Item_Value" in FIG. 18).

As the data type of the PJL value, there are "a fixed value type", "a variable type value", and "a variable type character string". The "fixed value type" includes the value select, the binary, and so on. The "variable type value" includes values. The "variable type character string" includes character strings. The data type of PJL may be further divided in view of which the table type corresponding to the PJL value is "one-dimensional converting type" or "indexed type".

The PJL prohibited combination information 2051 may show combinations of more than two pieces of PJL item information having a prohibited relationship.

More specifically, the first row of the PJL prohibited combination information 2051a shows the PJL item information in which the PJL configuration item is "A1", the data type of the PJL value is a "fixed value" and the PJL value is "a11", and the PJL item information in which the PJL configuration item is "A6", the data type of the PJL value is a "fixed value" and the PJL value is "a61" have a prohibited relationship.

The PJL prohibited combination information 2051b of the second row shows the PJL item information in which the PJL configuration item is "A2", the data type of the PJL value is a "variable type value" and the PJL value is "P3 (A2)" (P3 is a function), and the PJL item information in which the PJL configuration item is "A3", the data type of the PJL value is a "variable type value" and the PJL value is "P5 (A3)" (P5 is a function) have a prohibited relationship.

The PJL prohibited combination information 2051c of the third row shows the PJL item information in which the PJL configuration item is "A4_1", the data type of the PJL value is a "variable type character string" and the PJL value is arbitrary (an arbitrary character string), and the PJL item information in which the PJL configuration item is "A1", the data type of the PJL is a "fixed value type" and the PJL value is "a12" have a prohibited relationship.

Data type determining unit 2202 determines whether the data type of the PJL value included in the PJL prohibited combination information 2051 acquired by prohibition information acquire unit 2201 is a fixed value selective type or a variable type. When there is a variable type as the data type of the PJL value, data type determining unit 2202 determines that the data type of the PJL value is the variable type.

More specifically, as for the PJL prohibited combination information 2051a, the data type of the PJL value is determined as the fixed value selective type. As for the PJL prohibited combination information 2051b and 2051c, the data type of the PJL value is determined as the variable type.

When the data type of the PJL value is determined as the variable type by data type determining unit 2403, the first prohibition information generating unit 2203 generates the prohibited combination information 2052, in line with the procedure shown in FIG. 19, based on the PJL prohibited combination information 2051 and resolve PJL table 1052.

The first prohibition information generating unit 2203 extracts a combination of the resolve PJL table ID and information of resolve PJL table inner index which coincides with both of the PJL configuration item and the PJL value disclosed in the PJL prohibited combination information 2051, from resolve PJL table 1052 (#2101). This combination becomes the prohibited combination information 2052.

For example, the PJL prohibited combination information 2051a discloses information prescribed by "A1" as the PJL configuration item and "a11" as the PJL value, and information prescribed by "A6" as the PJL configuration item and "a61" as the PJL value. In this instance, the first prohibition information generating unit 2203 extracts the combination of pieces of information of setting values, from resolve PJL tables 1521 (FIG. 7) and 1526 (FIG. 12), wherein the first information coincides with both of "A1" and "a11" and is for setting values prescribed by "T1" as the resolve PJL table ID and "T11" as the resolve PJL table inner index, and the second information coincides with both of "A6" and "a61" and is for setting values prescribed by "T6" as the resolve PJL table ID and "T61" as the resolve PJL table inner index. The combination becomes the prohibited combination information 2052a.

Similarly, the first prohibition information generating unit 2203 extracts the combination of pieces of information of setting values, from resolve PJL tables 1521 (FIG. 7) and 1526 (FIG. 12), wherein the first information coincides with both of "A1" and "a11" and is for setting values prescribed by "T1" as the resolve PJL table ID and "T11" as the resolve PJL table inner index, and the second information coincides with both of "A6" and "a61" and is for setting values prescribed by "T6" as the resolve PJL table ID and "T63" as the resolve PJL table inner index. The combination becomes the prohibited combination information 2052b.

Next, the first prohibition information generating unit 2203 writes the extracted information as the prohibited combination information 2052, into inter resolve PJL table prohibition table 2152 (FIG. 21) (an example of a prohibition table) (#2102).

When data type determining unit 2202 determined that the data type of the PJL value is the variable type, the second prohibition information generating unit 2204 generates the prohibited combination information 2052 based on the PJL prohibited combination information 2051 and resolve PJL table 1052, by the procedure shown in FIG. 20.

The second prohibition information generating unit 2204 extracts a combination of the resolve PJL table ID and information of the resolve PJL table inner index coincides with the PJL configuration item disclosed in the PJL prohibited combination information 2051, from resolve PJL table 1052 (#2201). At the process of step #2201, the second prohibition information generating unit 2204 does not refer to the PJL value. The combination becomes the prohibited combination information 2052.

For example, The PJL prohibited combination information 2051b discloses information prescribed by "A2" as the PJL configuration item and "P3 (A2)" as the PJL value, and information prescribed by "A3" as the PJL configuration item and "P5 (A3)" as the PJL value. In this instance, the second prohibition information generating unit 2204 extracts the combination of pieces of information of setting values, from resolve PJL tables 1522 (FIG. 8) and 1523 (FIG. 9), wherein the first information coincides with "A2" and is for setting values prescribed by "T2" as resolve PJL table ID and "T21" as the resolve PJL table inner index, and the second information coincides with "A3" is for setting values prescribed by "T3" as the resolve PJL table ID and "T31" as the resolve PJL table inner index. The combination becomes the prohibited combination information 2052c.

Similarly, the second prohibition information generating unit 2204 extracts the combination of pieces of information of setting values, from resolve PJL tables 1522 (FIG. 8) and 1523 (FIG. 9), wherein the first information coincides with "A2" and is for setting values prescribed by "T2" as resolve PJL table ID and "T21" as the resolve PJL table inner index, and the second information coincides with "A3" is for setting values prescribed by "T3" as the resolve PJL table ID and "T32" as the resolve PJL table inner index. The combination becomes the prohibited combination information 2052d.

The PJL prohibited combination information 2051c discloses information prescribed by "A4_1" as the PJL configuration item, and information prescribed by "A1" as the PJL configuration item and "a12" as the PJL value. In this instance, the second prohibition information generating unit 2204 extracts the combination of pieces of information of setting values, from resolve PJL tables 1524 (FIG. 10) and 1521 (FIG. 7), wherein the first information coincides with "A4_1" and is for setting values prescribed by "T4" as resolve PJL table ID and "T41" as the resolve PJL table inner index, and the second information coincides with both of "A1" and "a12" is for setting values prescribed by "T1" as the resolve PJL table ID and "T12" as the resolve PJL table inner index. The combination becomes the prohibited combination information 2052e.

Similarly, the second prohibition information generating unit 2204 extracts the combination of pieces of information of setting values, from resolve PJL tables 1524 (FIG. 10) and 1521 (FIG. 7), wherein the first information coincides with "A4_1" and is for setting values prescribed by "T4" as resolve PJL table ID and "T42" as the resolve PJL table inner index, and the second information coincides with both of "A1" and "a12" is for setting values prescribed by "T1" as the resolve PJL table ID and "T12" as the resolve PJL table inner index. The combination becomes the prohibited combination information 2052f.

Next, the second prohibition information generating unit 2204 writes the extracted information as the prohibited combination information 2052 into inter resolve PJL table prohibition table 2152 (#2202). At step #2202, when the data type of the PJL value of the PJL prohibited combination information 2051 is the variable type, the second prohibition information generating unit 2204 adds the PJL value included in the prohibited combination information 2052 which was extracted, and writes it into inter resolve PJL table prohibition table 2152 (FIG. 21).

For example, two pieces of the PJL item information of the PJL prohibited combination information 2051b include "P3 (A2)" and "P5 (A3)" as the PJL values, respectively. In this instance, the PJL values are added to the prohibited combination information 2052c and 2052d, and the prohibited combination information 2052c and 2052d are written into inter resolve PJL table prohibition table 2152.

In one piece of PJL item information in the PJL prohibited combination information 2051c, the PJL value is an arbitrary character string. In this instance, the PJL value is added to each of the prohibited combination information 2052e and 2052f, and the prohibited combination information 2052e and 2052f is written in inter resolve PJL table prohibition table 2152.

In prohibition table storage unit 2205, inter resolve PJL table prohibition table 2152 shown by FIG. 21 is stored. The inter resolve PJL table prohibition table 2152 shows combinations of setting values of which the input is received on terminal device 2, which are combinations of setting values having prohibited relationships, and includes a plurality of pieces of the prohibited combination information 2052. When the PJL value corresponding to the setting value included in the prohibited combination information 2052 is a fixed value data type, the prohibited combination information 2052 includes resolve PJL table ID which is information to identify resolve PJL table 1052 which relates to the setting value having a prohibited relationship and the resolve PJL table inner index corresponding to the setting value having a prohibited relationship on resolve PJL table 1052 ("resolve PJL inner index" in FIG. 21). When the PJL value corresponding to the setting value included in the prohibited combination information 2052 is the variable data type, the prohibited combination information 2052 further includes a condition of the PJL value of the setting value having a prohibited relationship ("condition of the PJL value" in FIG. 21).

The prohibited combination information 2052 may indicate a combination of three or more setting values having a prohibited relationship.

More specifically, the prohibited combination information 2052a indicate the setting value prescribed by "T1" as the resolve PJL table ID and "T11" as the resolve PJL table inner index, and the setting value prescribed by "T6" as the resolve PJL table ID and "T61" as the resolve PJL table inner index are in a prohibited relationship.

In a case that the PJL value specified by "T2" as resolve PJL table ID and "T21" as the resolve PJL table inner index satisfies "P3 (A2)" as the condition of the PJL value, and the PJL value prescribed by "T3" as resolve PJL table ID and "T31" as the resolve PJL table inner index satisfies "P5 (A3)" as the condition of the PJL value, the prohibited combination information 2052c shows these setting values are in a prohibited relationship.

Further, the prohibited combination information 2052e shows the setting values in which the PJL value prescribed by "T4" as the resolve PJL table ID and "T41" as the resolve PJL table inner index is an arbitrary value (character string), and the setting values prescribed by "T1" as the resolve PJL table ID and "T12" as the resolve PJL table inner index are in a prohibited relationship.

Next, an example of the overall processing flow when terminal device 2 executes a generation process of the prohibited combination information will be explained, referring to the flowchart shown in FIG. 22. This process is executed based on the prohibited relationship generating program 2020P.

Terminal device 2 acquires the PJL prohibited combination information 2051 described in the main body prohibition table 2151, at arbitrary timing when the connection with image forming apparatus 1 was established, for example (#2001).

Next, terminal device 2 determines whether the data type of the PJL value of the acquired PJL prohibited combination information 2051 is the fixed value selective type or the variable type (#2002).

At step #2002, when it is determined that the data type of the PJL value of the acquired PJL prohibited combination information 2051 is the fixed value selective type ("fixed value selective type" in #2002), terminal device 2 executes the generating process for fixed value selective type inter PJL table prohibition information (FIG. 19), to generate the prohibited combination information (#2003), and steps in the process of step #2005.

At step #2002, when it is determined that the data type of the PJL value of the acquired PJL prohibited combination information 2051 is the variable type ("variable type" in #2002), terminal device 2 executes the generating process for variable type inter PJL table prohibition information (FIG. 20), to generate the prohibited combination information (#2004), and steps in the process of step #2005.

At step #2005, terminal device 2 determines whether the prohibited combination information for all the PJL prohibited combination information 2051 described in the main body prohibition table 2151 was generated or not (#2005).

At step #2005, when it is determined that the prohibited combination information for all the PJL prohibited combination information 2051 described in the main body prohibition table 2151 is not generated (NO at #2005), terminal device 2 proceeds to the process of step #2001 to acquire other PJL prohibited combination information 2051 described in the main body prohibition table 2151.

At step #2005, when it is determined that the prohibited combination information for all the PJL prohibited combination information 2051 described in the main body prohibition table 2151 was generated (YES at #2005), terminal device 2 terminates the process.

The Detection Method of a Prohibited Relationship

Next, the detection method for a prohibited relationship will be explained.

When the change of at least one of setting values is received on dialog box 1071 (FIG. 5), terminal device 2 detects the presence or absence of a prohibited relationship between the setting value for which the change was received and other setting values configured on terminal device 2, based on PJL index table 1051, resolve PJL table 1052, and inter resolve PJL table prohibition table 2152 (FIG. 21). Terminal device 2 stores the prohibited relationship detecting program 2030P in subsidiary storage device 20d for detecting a prohibited relationship.

Figure 23:
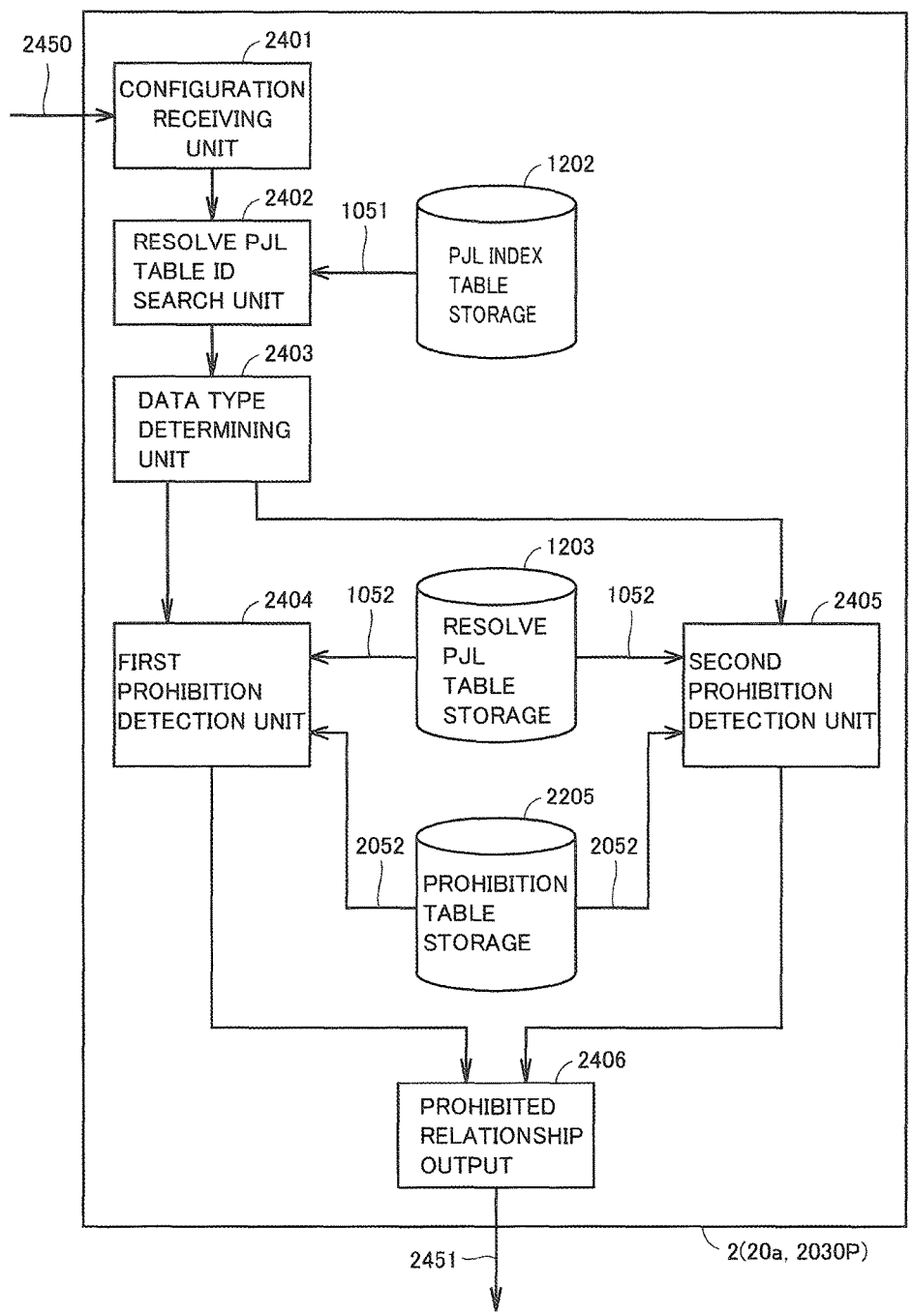
FIG. 23 shows an example of a functional structure relates to detection of a prohibited relationship of terminal device 2.
Figure 24:
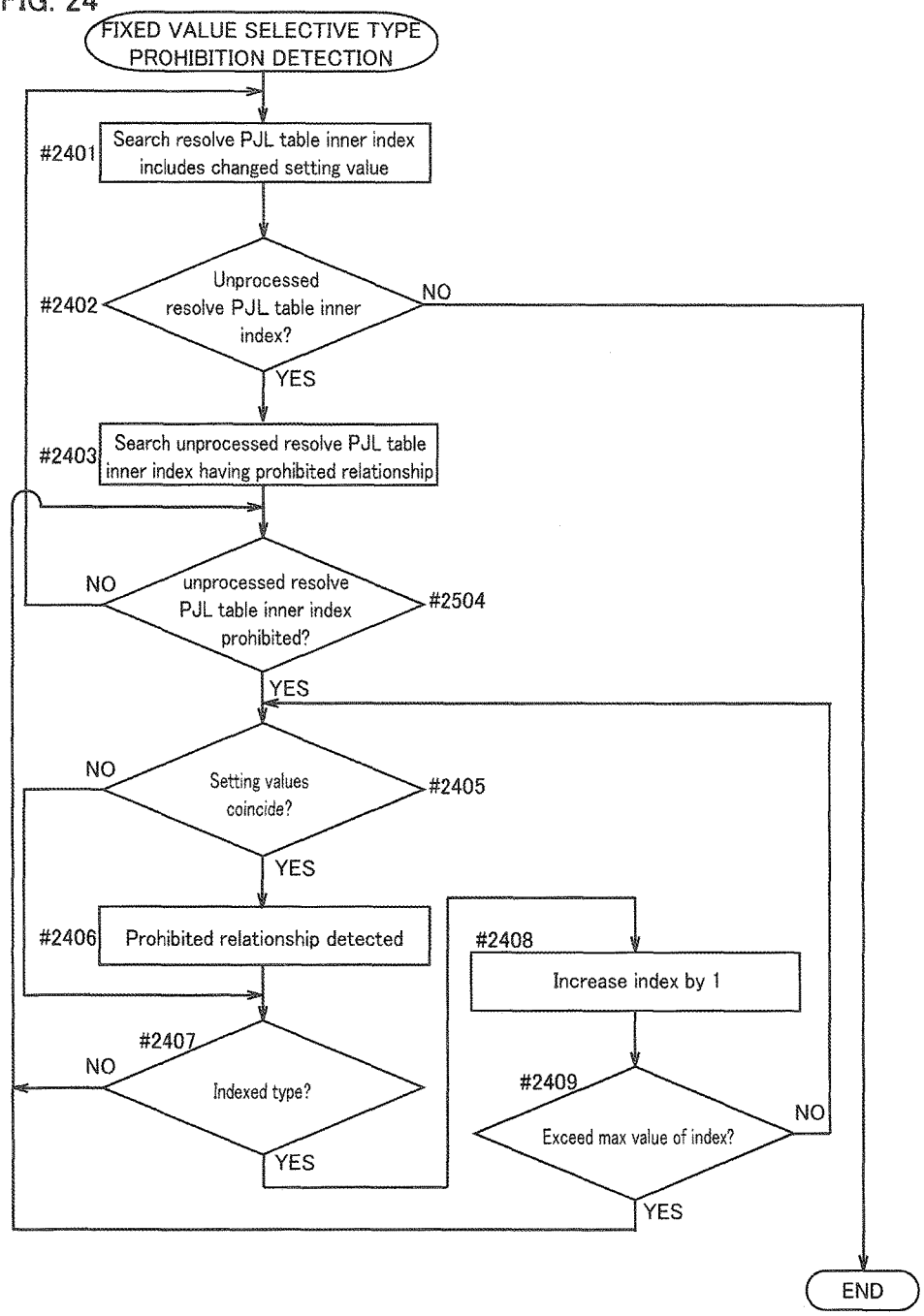
FIG. 24 shows a flowchart of a fixed type selective type prohibition detection process.
Figure 25:
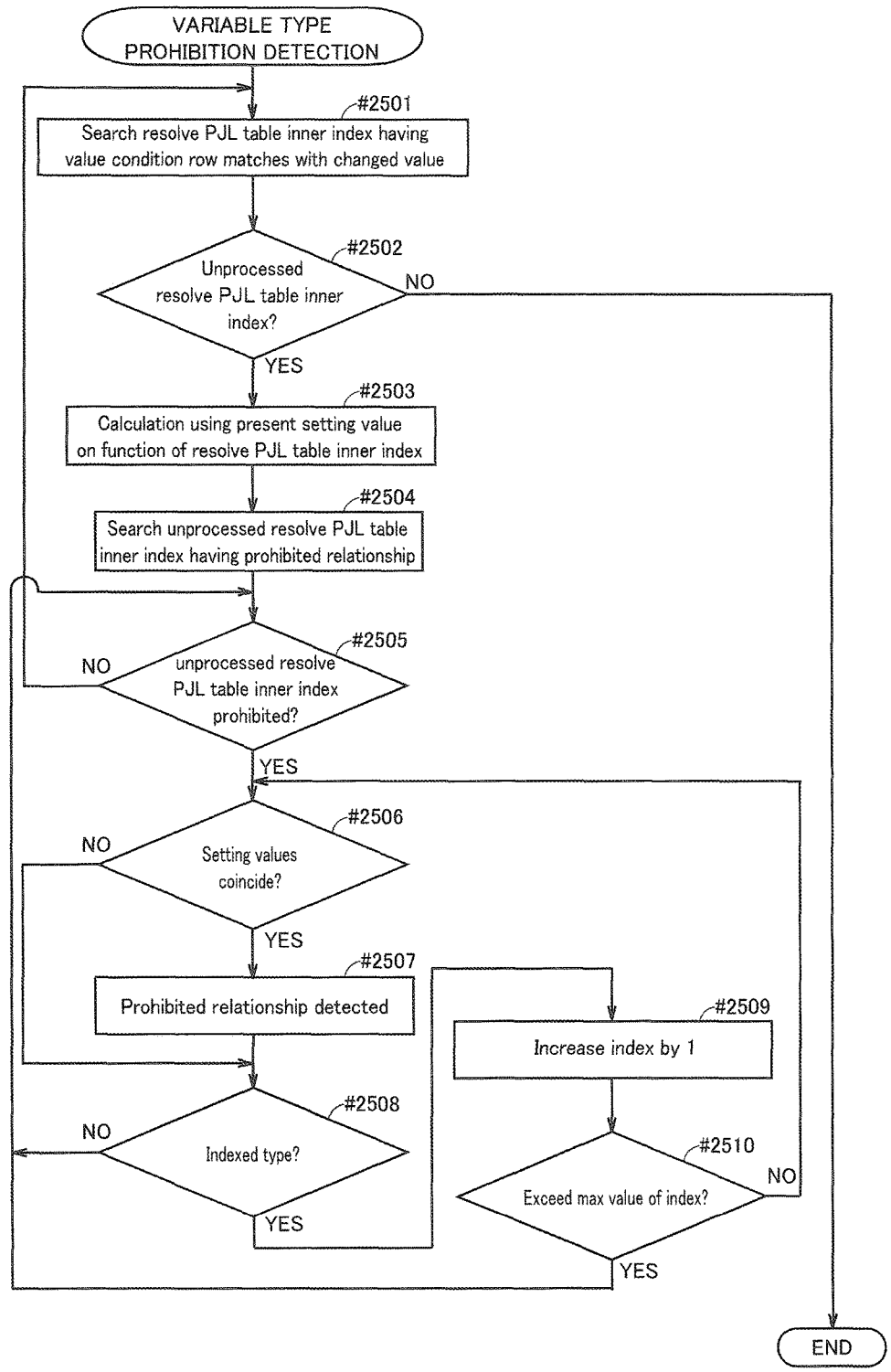
FIG. 25 shows a flowchart of a variable type prohibition detection process.
Figure 26:
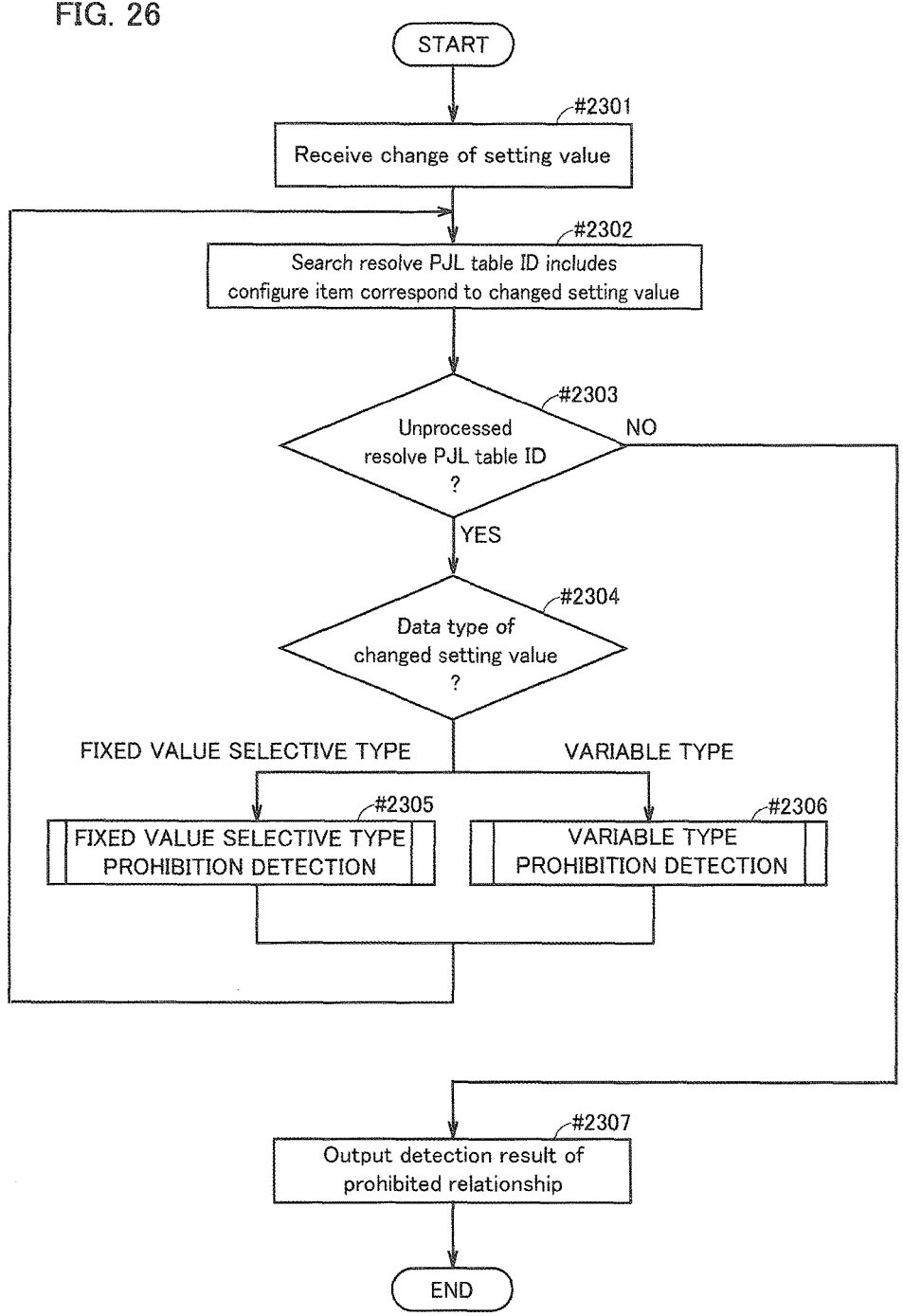
FIG. 26 shows a flowchart for explanation of an example of overall flow of the detection process for a prohibited relationship executed by terminal device 2.

FIG. 23 shows an example of a functional structure relates to detection of a prohibited relationship of terminal device 2. FIG. 24 shows a flowchart of a fixed type selective type prohibition detection process. FIG. 25 shows a flowchart of a variable type prohibition detection process. FIG. 26 shows a flowchart for explanation of an example of overall flow of the detection process for a prohibited relationship executed by terminal device 2.

According to the prohibited relationship detecting program 2030P, as shown by FIG. 23, configuration receiving unit 2401, resolve PJL table ID search unit 2402, data type determining unit 2403, the first prohibition detection unit 2404, the second prohibition detection unit 2405, prohibited relationship output unit 2406, and so on are realized on terminal device 2. The prohibited relationship detecting program 2030P is loaded into RAM 20b, and executed by CPU 20a, like other programs as mentioned the above.

PJL index table storage unit 1202 stores PJL index table 1051 shown by FIG. 6. Resolve PJL table storage unit 1203 stores resolve PJL tables 1052 shown in FIGS. 7 to 12. Prohibition table storage unit 2205 stores inter resolve PJL table prohibition table 2152 shown in FIG. 21.

Configuration receiving unit 2401 receives change 2450 of setting values on dialog box 1071 (FIG. 5).

The case in which "B1" as a setting value of a configuration item (FIG. 7) is changed from "b11" to "b12" (which is referred to as case 1), and in which "B6" as a setting value of a configuration item (FIG. 9) is changed to "90" (which is referred to as case 2) will be explained as the example.

Resolve PJL table ID search unit 2402 refers to PJL index table 1051, to search the resolve PJL table ID corresponding to the configuration item in which the setting value was changed. As the result of the search, a plurality of resolve PJL tables may be extracted with respect to one configuration item.

More specifically, as the case 1, "T1" as the resolve PJL table ID corresponding to "B1" is extracted (identified). As the case 2, "T3" as the resolve PJL table ID corresponding to "B6" is extracted.

Data type determining unit 2403 refers to resolve PJL table 1052 having the extracted resolve PJL table ID, and determines whether the data type of the changed setting value on PJL index table 1051 is the fixed value selective type or the variable type. The fixed value selective type is a data type in which a value is selected among a plurality of fixed values, such as the value select and the binary. The variable type is such as a value and the character string (string).

More specifically, as case 1, resolve PJL table 1521 having "T1" as the resolve PJL table ID (FIG. 7) is referred, and the data type of "b11" as the setting value is determined as the fixed value selective type. As case 2, resolve PJL table 1523 having "T3" as the resolve PJL table ID (FIG. 9) is referred, and the data type of "90" as the setting value is determined as the variable type.

When data type determining unit 2403 determined that the data type of the changed setting value is the fixed value selective type, the first prohibition detection unit 2404 detects whether the changed setting value and the other setting values are in a prohibited relationship or not, by the procedure shown by FIG. 24 (the fixed value selective type prohibition detection process).

The first prohibition detection unit 2404 searches (identifies) the resolve PJL table inner index which includes the changed setting value, in resolve PJL table 1052 having the resolve PJL table ID extracted by resolve PJL table ID search unit 2402 (#2401 and #2402). As the result of the search, a plurality of resolve PJL table inner indexes may be identified with respect to one changed setting value.

More specifically, according to the case 1, "T11" as the resolve PJL table inner index which includes "b11" as the setting value is identified, in resolve PJL table 1521 (FIG. 7) having "T1" as the resolve PJL table ID.

Next, the first prohibition detection unit 2404 extracts the resolve PJL table inner index having a prohibited relationship with the identified resolve PJL table inner index from inter resolve PJL table prohibition table 2152 (#2403 and #2404). As the result of the search, the number of the extracted resolve PJL table inner indexes is arbitrary, and it may be zero.

More specifically, according to the case 1, "T61" as the resolve PJL table inner index is extracted from the prohibited combination information 2052a which includes a combination of resolve PJL table inner indexes {T11, T61}, and "T63" as the resolve PJL table inner index is extracted from the prohibited combination information 2052b which includes a combination of resolve PJL table inner indexes {T11, T63}.

Next, the first prohibition detection unit 2404 extracts setting values from the resolve PJL table inner index having a prohibited relationship. The first prohibition detection unit 2404 prescribes a condition in which the extracted setting values are an AND condition, and compares it with the present setting value (#2405).

As the result of the comparison, when the setting value of the prescribed condition coincides with the present setting value, the first prohibition detection unit 2404 detects the present setting values are in a prohibited relationship (#2406). When they do not coincide with each other, a prohibited relationship is not detected. When a plurality of resolve PJL table inner indexes having prohibited relationships are extracted, the comparison is repeated for all resolve PJL table inner indexes having prohibited relationships.

More specifically, according to the case 1, from "T11" as the PJL table inner index (FIG. 7), "b11" as the setting value of "B1" as the configuration item (B1=b11) is extracted, and "b21" as the setting value of "B2" as the configuration item (B2=b21) is extracted. From "T61" as the PJL table inner index (FIG. 12), "b74" as the setting value of "B7_3" as the configuration item (B7_3=b74) is extracted. Then, from the extracted setting values, the condition "B1=b11, B2=b21, and B7_3=b74" is prescribed. The setting values of the condition and the present setting values (the setting values configured on dialog box 1071 (FIG. 5) at present) are compared.

When the table type of the indexed type (which includes a setting value as the s*t matrix) is included in the resolve PJL table inner indexes included in the extracted prohibited combination information 2052 (YES at #2407), the first prohibition detection unit 2404 increases the index of the setting value of the resolve PJL table inner index by 1, and compares the next configuration in the resolve PJL table inner index with the present setting value. Until the index of the setting value exceeds the maximum value (Before finishing comparing of all the setting values), the first prohibition detection unit 2404 repeats the above mentioned comparison (#2408 and #2409).

When data type determining unit 2403 determined that the data type of the changed setting value is the variable type, the second prohibition detection unit 2405 detects whether the changed setting value and the other setting values are in a prohibited relationship or not, according to the procedure shown in FIG. 25 (the variable type prohibition detection process).

The second prohibition detection unit 2405 searches (identifies) the resolve PJL table inner index having the value condition row coincides with the changed setting value in the resolve PJL table having the resolve PJL table ID extracted by resolve PJL table ID search unit 2402 (#2501 and #2502). As the result of the search, a plurality of resolve PJL table inner indexes may be identified with respect to the changed setting value.

More specifically, according to the case 2, "T31" as the resolve PJL table inner index having the value condition row ("B6 <100") coincides with the changed setting value "B6 =90" is identified, from the resolve PJL table 1523 (FIG. 9) having "T3" as the resolve PJL table ID. "T32" as the resolve PJL table inner index is not identified, since the value condition row is not matched.

Next, the second prohibition detection unit 2405 converts the changed setting value to the PJL value, by calculation using the changed setting value on the function included the identified resolve PJL table inner index (#2503). The calculation types include a calculation using a function and so on, for when the setting value is a numerical value. The calculation types include dividing and joining of a character string, acquirement of the character string length and so on, for when the setting value is a character string.

More specifically, according to the case 2, "B6 =90" is assigned to the function "B6*B8" of "T31" as the resolve PJL table inner index, and calculation is executed.

Next, when the calculation result satisfies the condition of the PJL value of the prohibited combination information 2052, the second prohibition detection unit 2405 extracts the identified resolve PJL table ID and resolve PJL table inner index, and the resolve PJL table inner index having a prohibited relationship with the calculation result (the PJL value), from inter resolve PJL table prohibition table 2152 (#2504 and #2505). As the result of the search, the number of the extracted resolve PJL table inner indexes is arbitrary, and it may be zero.

More specifically, according to the case 2, when the calculation result satisfies "P5 (A3)" as the condition of the PJL value, "T21" as the resolve PJL table inner index is extracted, from the prohibited combination information 2052c which includes a combination of {T21, T31} as the resolve PJL table inner indexes.

Next, the second prohibition detection unit 2405 extracts a setting value, from the resolve PJL table inner index having a prohibited relationship. The second prohibition detection unit 2405 compares the extracted setting value with the present setting value (#2506).

When the extracted resolve PJL table inner index includes the condition of the PJL value ("PJL value condition" in FIG. 21) in the prohibited combination information 2052, the second prohibition detection unit 2405 calculates the PJL value by using the present setting value of the resolve PJL table inner index, and compares the calculated PJL value with the condition of the PJL value, at step #2506.

When the extracted setting value coincides with the present setting value (When the extracted resolve PJL table inner index includes the condition of the PJL value, and the calculated PJL value satisfies the condition of the PJL value), the second prohibition detection unit 2405 detects that the present setting values are in a prohibited relationship (#2507). Otherwise, the second prohibition detection unit 2405 does not detect a prohibited relationship. When a plurality of the resolve PJL table inner indexes having prohibited relationships were extracted, the comparison is repeated for all the resolve PJL table inner indexes having prohibited relationships.

More specifically, according to the case 2, in the relevant prohibited combination information 2052c, "T21" as the resolve PJL table inner index having a prohibited relationship includes "P3 (A2)" as the condition of the PJL value. Therefore, by using the present setting value of the resolve PJL table inner index having a prohibited relationship, the PJL value is calculated on the function "B4*B5*B3", and the calculated PJL value and "P3 (A2)" as the condition of the PJL value are compared.

When the table type of the indexed type (which includes a setting value as the s*t matrix) is included in the resolve PJL table inner indexes included in the extracted prohibited combination information 2052 (YES at #2508), the second prohibition detection unit 2405 increases the index of the setting value of the resolve PJL table inner index by 1, and compares the next setting value in the resolve PJL table inner index with the present setting value. Until the index of the setting value exceeds the maximum value (Before finishing comparing of all the setting values), the second prohibition detection unit 2405 repeats the above mentioned comparison (#2509 and #2510).

The prohibited relationship output unit 2406 outputs the detection result 2451 of the prohibited relationship by the first prohibition detection unit 2404 or the second prohibition detection unit 2405.

Next, an example of the flow of the overall processing when terminal device 2 detects a prohibited relationship will be explained, referring to the flowchart of FIG. 26. The process is performed based on the prohibited relationship detecting program 2030P.

When terminal device 2 receives change 2450 of setting values on dialog box 1071 (FIG. 5) (#2301), terminal device 2 refers to PJL index table 1051, and searches resolve PJL table ID which includes the configuration item corresponding to the changed setting value (#2302). Next, terminal device 2 determines whether there is a resolve PJL table ID unprocessed (which was not processed by #2305 or #2306) among resolve PJL table IDs which includes the configuration item corresponding to the changed setting value, or not (#2303).

At step #2303, when it is determined that there is an unprocessed resolve PJL table ID (YES at #2303), terminal device 2 refers to resolve PJL table 1052 of the unprocessed resolve PJL table ID, and determines whether the data type of the changed setting value is the fixed value selective type or the variable type (#2304).

At step #2304, when it is determined that the data type of the changed setting value is the fixed value selective type ("fixed value selective type" at #2304), terminal device 2 executes the fixed value selective type prohibition detection process (FIG. 24), to detect a prohibited relationship of the present setting value (#2305), and steps in the process of step #2302.

At step #2304, when it is determined that the data type of the changed setting value is the variable type ("variable type" at #2304), terminal device 2 executes variable type prohibition detection process (FIG. 25), to detect a prohibited relationship of the present setting value (#2306), and steps in the process of step #2302.

At step #2303, when it is determined that there is not an unprocessed resolve PJL table ID (NO at #2303), terminal device 2 outputs the detection result 2451 of the prohibited relationship to prohibited relationship information receiving unit 3105, which will be explained later, and terminates the process.

The Avoidance Method of the Prohibited Relationship

Next, the avoidance method of the prohibited relationship, when the prohibited relationship was found, will be explained.

Figure 27:
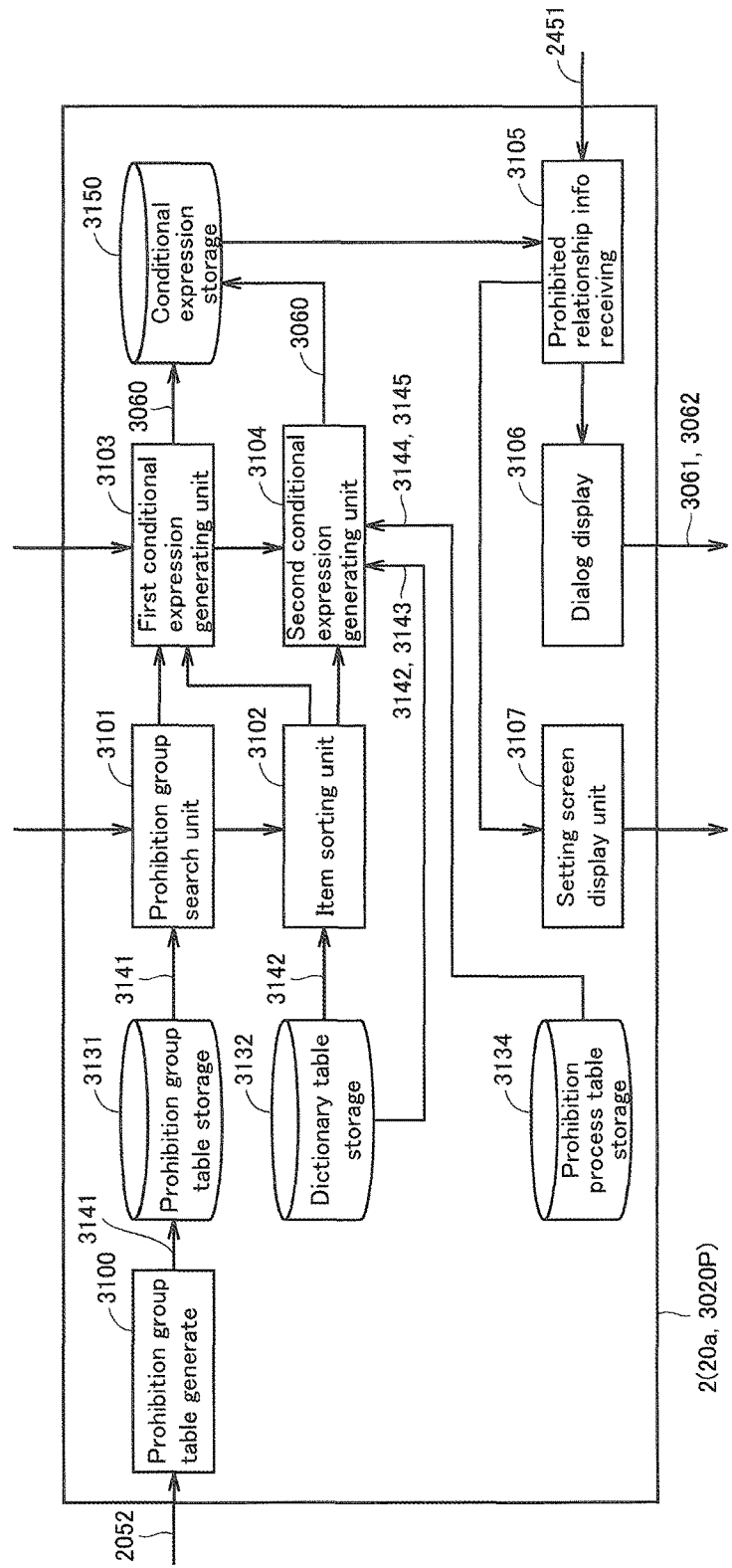
FIG. 27 shows an example of a functional structure relates to avoidance of a prohibited relationship of terminal device 2.
Figure 31:
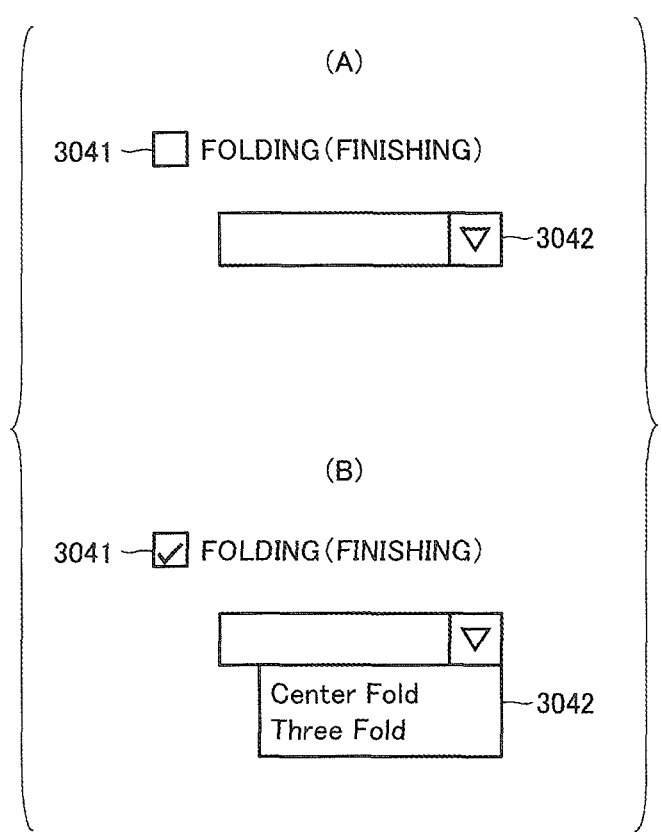
FIG. 31 shows an example of the control.

FIG. 27 shows an example of a functional structure relates to avoidance of a prohibited relationship of terminal device 2. FIG. 28 shows an example of prohibition group table 3141. FIG. 29 shows an example of priority dictionary table 3142. FIG. 30 shows an example of attribute dictionary table 3143. FIG. 31 shows an example of control. FIG. 32 shows an example of the first prohibition process table 3144. FIG. 33 shows an example of the second prohibition process table 3145.

According to the prohibition avoidance conditional expression generating program 3020P, as shown in FIG. 27, prohibition group table generating unit 3100, prohibited group search unit 3101, item sorting unit 3102, the first conditional expression generating unit 3103, the second conditional expression generating unit 3104, prohibited relationship information receiving unit 3105, dialog display unit 3106, setting screen display unit 3107, prohibition group table storage unit 3131, dictionary table storage unit 3132, prohibition process table storage unit 3134, and so on are realized. The prohibition avoidance conditional expression generating program 3020P is loaded into RAM 20b, and executed by CPU 20a, like other programs as mentioned the above.

Prohibition group table generating unit 3100 generates prohibition group table 3141, based on the prohibited combination information 2052.

Prohibition group table storage unit 3131 stores prohibition group table 3141. Prohibition group table 3141 shows the presence or absence of a prohibited relationship for each of value groups of the plurality of items. FIG. 28 shows prohibition group table 3141 for the configuration which relates to finishing as making punching holes.

Prohibition group table 3141 indicates 4 items of the "sheet size", the "document orientation", the "number of the punching holes", and the "punching location".

The sheet size indicates the size of printed papers on which punching holes are to be made. The item can take the value of "A3" or "A4". The "A3" means A3 size, and the "A4" means A4 size. The number of the punching holes indicates number of the punching holes which are made on the printed papers. The punching location indicates the location where punching holes are made on the printed papers.

The document orientation indicates the orientation of the printed papers. The item can take "vertical" or "horizontal". The "vertical" means a vertical (portrait) document, and the "horizontal" means a horizontal (landscape) document.

Referring back to FIG. 27, dictionary table storage unit 3132 stores priority dictionary table 3142 and attribute dictionary table 3143.

In priority dictionary table 3142, as shown by FIG. 29, the priority of each of items are shown. The "priority" indicates the degree to which the value of the item is preferentially maintained over other items on avoidance of the prohibited relationship. Namely, values of items with lower priority are easier to be processed so that the values are changed to other values, for avoidance of a prohibited relationship, for example. The priority may be expressed as "importance". Higher priority is set for items preferably to be preferentially configured over other items. The priority is higher in order of "1", "2", . . . .

Attribute dictionary table 3143 stores attribute data 3050 for each of items, as shown in FIG. 30. In the followings, each of pieces of attribute data 3050 may be referred to as "attribute data 3051", "attribute data 3052", "attribute data 3053", "attribute data 3054", "attribute data 3055", "attribute data 3056" . . . , to distinguish each other.

In attribute data 3050, the "setting value" indicates values which can be set for the item.

The "Recover Value" indicates candidate values to change the setting values, to avoid the prohibited relationship. Namely, the candidate values are to recover from the prohibited relationship to normal state. Setting values may have one Recover Value, or may have a plurality of Recover Values. When the number of Recover Values is one, the candidate value is indicated in "Recover Value 1". When the number of Recover Values is more than 1, the Recover Values are indicated in order of "Recover Value1", "Recover Value2", . . . from the preferentially used candidate value.

The "control type" indicates the control type used for configuration of the value on the item.

The "control" is an element (object) for displaying to receive input of information or instructions. There are cases that a plurality of controls are combined and used, for configuration of one item.

The "ComboBox", the "CheckBox", the "Radio Button", and the "Button" mean a combobox, a checkbox, a radio button, and a button which are used respectively as controls, which are public knowledge of HTML (Hypertext Markup Language), for example.

The "paired CheckBox" indicates the CheckBox identifier, when the control type is a combination (pair) of the CheckBox and another control.

For example, the control type of the item of Folding is "CheckBox +ComboBox". It means that a checkbox and a combobox are combined and used as a control. For example, as shown in FIG. 31(A), checkbox 3041 and combobox 3042 are used as a control. When the identifier "CheckFold" is assigned to checkbox 3041, "CheckFold" is set as the paired CheckBox, as attribute data 3051. When checkbox 3041 is turned "On", and the triangle button was selected, the drop down list appears to show options of values "center folding" and "three-folding", as shown in FIG. 31(B).

Priority dictionary table 3142 shows priority of each of the sheet size, the number of the punching holes, and the punching location, other than priority of each of items shown in FIG. 29. Similarly, attribute dictionary table 3143 stores attribute data 3050 of each of the sheet size, the number of the punching holes, and the punching location, other than attribute data 3050 of each of items shown in FIG. 30.

Referring back to FIG. 27, prohibition process table storage unit 3134 stores the first prohibition process table 3144 and the second prohibition process table 3145.

The first prohibition process table 3144 shows what kind of processing is executed as the prohibition process (the process to avoid a prohibited relationship) based on the control types, and the identify number (the command type number) to identify the process, as shown in FIG. 32.

The second prohibition process table 3145 indicates the prohibition process and the command type number for each of the control types, as shown in FIG. 33.

Priority dictionary table 3142, attribute dictionary table 3143, the first prohibition process table 3144, and the second prohibition process table 3145 are prepared beforehand by the developer of image forming apparatus 1, or the like.

Next, a generation method of a prohibition avoidance conditional expression will be explained.

Figure 34:
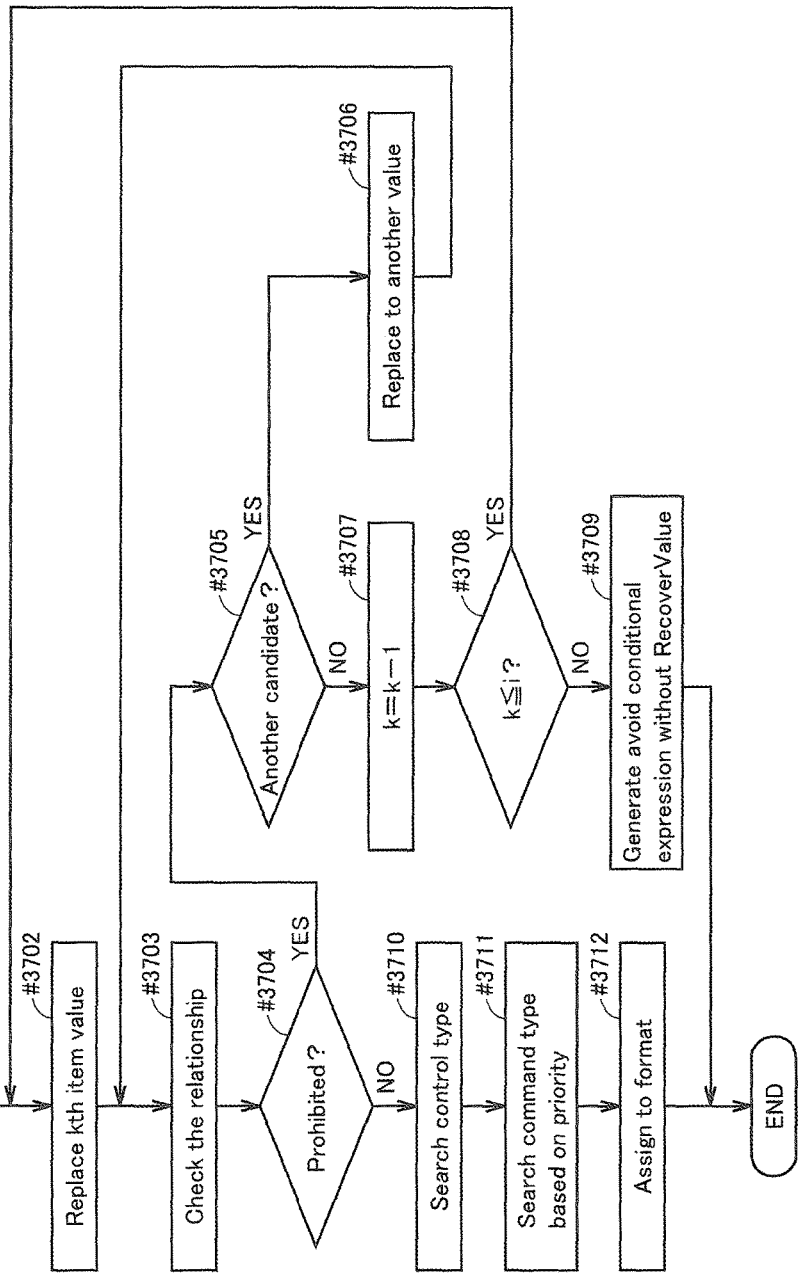
FIG. 34 shows a flowchart for explanation of an example of flow of a conditional expression generation process.

FIG. 34 shows a flowchart for explanation of an example of flow of a conditional expression generation process.

Prohibited group search unit 3101 searches prohibited groups (groups in a prohibited relationship, namely pairs of "x") among groups indicated by prohibition group table 3141 (See FIG. 28).

When a prohibited group was found by prohibited group search unit 3101, item sorting unit 3102 arranges the items which constitute the prohibited group, in descending order of priority shown in priority dictionary table 3142 (See FIG. 29).

For example, when the prohibited group of "x" indicated by the thick frame which is the third column from the right, and the second row from the top was found on prohibition group table 3141, the sheet size, the document orientation, the number of the punching holes, and the punching location are arranged to the sheet size, the number of the punching holes, the punching location, and the document orientation in descending order of the priority. A plurality of items which has same priority are arranged arbitrarily.

Item sorting unit 3102 prioritizes each of the items as "1", "2", . . . in descending order of priority. Same priority order is assigned to items which has same priority. Therefore, according to the above mentioned example, since the priority of the sheet size and the priority of the number of the punching holes are same, the sheet size, the number of the punching holes, the punching location, and the document orientation are prioritized as "1", "1", "3", and "4", respectively.

The first conditional expression generating unit 3103 and the second conditional expression generating unit 3104 generate a prohibition avoidance conditional expression of the prohibited group found by prohibited group search unit 3101, in response to the result of item sorting unit 3102.

The prohibition avoidance conditional expression has format of the expression (6) below.

$$\langle Item1\rangle,\langle Index\rangle=\langle Type\rangle,\langle Item1\text{-value}\rangle,\langle Item2\rangle,\\ \langle Item2\text{-value}\rangle,$$

$$\langle Item2\text{-Recover value}\rangle,\ldots,\langle Item(m+n)\rangle,\langle Item(m+n)\text{-value}\rangle,$$

$$\langle Item1\text{-Recover value}\rangle \quad\quad (6)$$

The element on the left side shows the following content. <Item1> is a trigger item. <Index> is a number to identify a prohibition avoidance conditional expression (for example, a sequence number, such as 1, 2, 3, . . . ).

The "trigger item" is an item of which the value is being configured, among items of the prohibited group. A "target item", which will be explained later, is an item which was configured before the trigger item, among items of the prohibited group.

The element on the right side shows the following content. <Item2>, . . . , <Item(m+n)> indicate items other than the trigger item, among items of the prohibited group, and show items having higher priority in descending order of the priority from the left (the top).

<ItemK-value> is a value of <ItemK>. However, $1 \leq K \leq (m+n)$. For example, <Item2-value> is the value of <Item2>. The "m+n" is the number of dimensions. It is "4" for prohibition group table 3141 (See FIG. 28).

Namely, when <Item1-Value> is configured to <Item1>, a prohibited relationship occurs in the group of <Item1-value>, <Item2-value>, . . . , and <Item(m+n)-value>.

<Type> is the command type number of the above mentioned prohibition process. However, <Type> may not be included in a prohibition avoidance conditional expression.

<ItemL-Recover value> is a value of <ItemL> by which the prohibited relationship can be avoided from the prohibited group. However, $2 \leq L \leq (m+n)$. More specifically, when <ItemL-value> is changed to <ItemL-Recover value>, the prohibited relationship can be avoided. However, <ItemL> does not necessarily have <ItemL-Recover value>. There may be <ItemL> having no <ItemL-Recover value>.

When number of items having lowest priority is one in the prohibited group found by prohibited group search unit 3101, the first conditional expression generating unit 3103 generates a prohibition avoidance conditional expression when the item is the trigger item and the remaining item is the target item, as follows.

The first conditional expression generating unit 3103 assigns the identifier (for example, the item name) of the item (the trigger item) to <Item1> in the left side of expression (6), and assigns the smallest number among numbers which were not issued to <Index>.

Further, the first conditional expression generating unit 3103 deletes <Type> in the right side of the expression (6). Or, a number to show the prohibition process is not performed may be assigned to <Type>. The item names of items (the remaining items) other than the trigger item are assigned to <Item2>, . . . , Item(m+n)>, in descending order of the priority. <Item2-Recover value>, . . . , <Item(m+n)-Recover value> are deleted.

For example, the above mentioned value "A3" of the item "sheet size", the value "horizontal" of the item "document orientation", the value "3 holes" of the item "number of the punching holes", and the value "top" of the item "the punching location" (the prohibited group shown by the thick frame in FIG. 28) are rearranged to the value "A3" of the "sheet size", the value "3 holes" of the item "number of the punching holes", the value "top" of the item "the punching location", and the value "horizontal" of the item "document orientation", by item sorting unit 3102, in descending order of priority. Moreover, the document orientation is an item having the lowest priority independently in the prohibited group.

Therefore, according to the above mentioned process by the first conditional expression generating unit 3103, the following expression (7) is generated as a prohibition avoidance conditional expression.

$$\text{Document orientation, 1=horizontal, sheet size, A3,}$$
$$\text{number of the punching holes, 3 holes, punching location, top} \quad (7)$$

In this manner, as for a prohibition avoidance conditional expression in which an item having the lowest priority independently is the trigger item and the remaining item is the target item, no condition related to the prohibition process is indicated. Therefore, the user should configure another value on the trigger item to avoid a prohibited relationship, which will be explained later.

The second conditional expression generating unit 3104 generates a prohibition avoidance conditional expression in which items other than an item having the lowest priority independently in the prohibited group found by prohibited group search unit 3101 are trigger items and the remaining item is the target item. The generating procedure is shown by FIG. 34.

In FIG. 34, the second conditional expression generating unit 3104 pays attention to the item having the lowest priority order (#3701). The attribute data 3050 of the item to which attention is paid (Hereinafter referred to as an "item of attention") is read from attribute dictionary table 3143 (FIG. 30), and the value of the item of attention of the prohibited group is replaced to Recover Value1 indicated by the read attribute data 3050 (#3702).

For example, when the item of attention is "document orientation" and the value is "horizontal", the second conditional expression generating unit 3104 reads attribute data 3054. According to attribute data 3054, Recover Value1 for "horizontal" is "vertical". Hence, the second conditional expression generating unit 3104 replaces the value of the item of attention to "vertical".

Next, the second conditional expression generating unit 3104 determines whether a prohibited relationship disappears in the prohibited group or not, by the replacement process of step #3702 (#3703). This determination can be executed based on prohibition group table 3141 (See FIG. 28).

For example, according to the above mentioned group which consists of the value "A3" of the item "sheet size", the value "horizontal" of the item "document orientation", the value "3 holes" of the item "number of the punching holes", and the value "top" of the item "the punching location" (See the thick frame of FIG. 28), the value of the document orientation is changed to "vertical" by step #3702. Then, as shown by the one higher cell from the cell with regard to the thick frame, the group after replacement does not have a prohibited relationship. Hence, the second conditional expression generating unit 3104 determines that the prohibited relationship disappears.

When the prohibited relationship disappeared by the replacement (NO at #3704), the second conditional expression generating unit 3104 generates a conditional expression to make a combination of the replaced values as a prohibition avoidance conditional expression (#3710 to #3712). This will be explained later.

When there is a prohibited relationship after this replacement (YES at #3704), and the read attribute data 3050 indicates another Recover Value (YES at #3705), the second conditional expression generating unit 3104 replaces the value of the item of attention to another Recover Value (#3706). Then, going back to step #3703 and whether the prohibited relationship disappears in the prohibited group or not is determined. When there are a plurality of the other Recover Values, it is replaced with Recover Value2, Recover Value3, . . . preferentially in this order.

When there is a prohibited relationship, even if the value of the item of attention is replaced with any Recover Value (YES at #3704, and NO at #3705), the second conditional expression generating unit 3104 pays attention to the item having one higher priority order (#3707). The replaced value is restored. When there is an item to which attention is not paid and having the same priority order, attention is paid to the item.

The second conditional expression generating unit 3104 appropriately executes the processes of steps #3702 to #3706. Namely, the value of the new item of attention is replaced with Recover Value1, Recover Value2, . . . until the prohibited relationship disappears.

The second conditional expression generating unit 3104 continues processing of steps #3702 to #3706, until the prohibited relationship disappears. Herewith, items with higher priority order are paid attention to one after another.

When the prohibited relationship does not disappear, even if the items with the same priority order as the trigger item are paid attention to and the processes of steps #3702 to #3706 are executed (NO at #3708), the second conditional expression generating unit 3104 generates a prohibition avoidance conditional expression in a manner similar to the first conditional expression generating unit 3103 (#3709).

More specifically, the second conditional expression generating unit 3104 assigns the identifier of the item (the trigger item) to <Item1> of the left side of expression (6), and assigns the smallest number among numbers which were not issued to <Index>. The <Type> in the right side of expression (6) is deleted, or a number to show a prohibition process is not performed is assigned to <Type>. The item names of items other than the trigger item (the remaining items) are assigned to <Item2>, ..., <Item(m+n)> in descending order of priority. <Item2-Recover value>, ..., <Item (m+n)-Recover value> are deleted.

On the other hand, when the value of the item of attention is replaced with a Recover Value and the prohibited relationship disappears (NO at #3704), the second conditional expression generating unit 3104 generates a prohibition avoidance conditional expression as follows.

The second conditional expression generating unit 3104 searches the control type in attribute data 3050 of the item of attention (#3710). Herewith, for example, when attribute data 3050 of the item of attention is attribute data 3054, "RadioButton" is hit.

The second conditional expression generating unit 3104 reads the command type number corresponding to the hit control type from the first prohibition process table 3144 (See FIG. 32) or the second prohibition process table 3145 (See FIG. 33) (#3711). More specifically, when the priority of the trigger item and the priority of the item of attention are same, the command type number is read from the first prohibition process table 3144. When they are different, the command type number is read from the second prohibition process table 3145.

The second conditional expression generating unit 3104 generates a prohibition avoidance conditional expression, by assigning the replaced value of the item of attention, the read command type number, and so on into expression (6), as follows (#3712).

As for the left side of expression (6), as mentioned above, the identifier of the trigger item is assigned to <Item1>, and the smallest number among numbers which were not issued is assigned to <Index>. The item names of items other than the trigger item (the remaining items) are assigned to <Item2>, ..., <Item(m+n)> of the right side, in descending order of priority, as mentioned above.

The read command type number is assigned to <Type> of the right side. The replaced value (the value by which the prohibited relationship disappears) is assigned to any of <Item2-Recover value>, ..., <Item(m+n)-Recover value>, which is related to the item of attention, and the remaining are deleted.

As for the above mentioned example in which the item "sheet size" is the value "A3", the item "document orientation" is the value "horizontal", the item "number of the punching holes" is the value "3 holes", and the item "punching location" is the value "top", when a prohibition avoidance conditional expression has already been generated, the command type number is "5", and the item of attention is the punching location, the prohibition avoidance conditional expression of expression (8) is generated by the process of FIG. 34.

> Punching location, 2=5, top, number of the punching holes, 3 holes, sheet size, A3, document orientation, horizontal, vertical (8)

As mentioned above, according to the first conditional expression generating unit 3103, a prohibition avoidance conditional expression of an item having the lowest priority independently in the prohibited group is generated. According to the second conditional expression generating unit 3104, a prohibition avoidance conditional expression for the remaining item is generated.

When a prohibition avoidance conditional expression is generated by the first conditional expression generating unit 3103 or the second conditional expression generating unit 3104, the conditional expression data 3060 showing the prohibition avoidance conditional expression is stored in conditional expression storage unit 3150.

Figure 35:
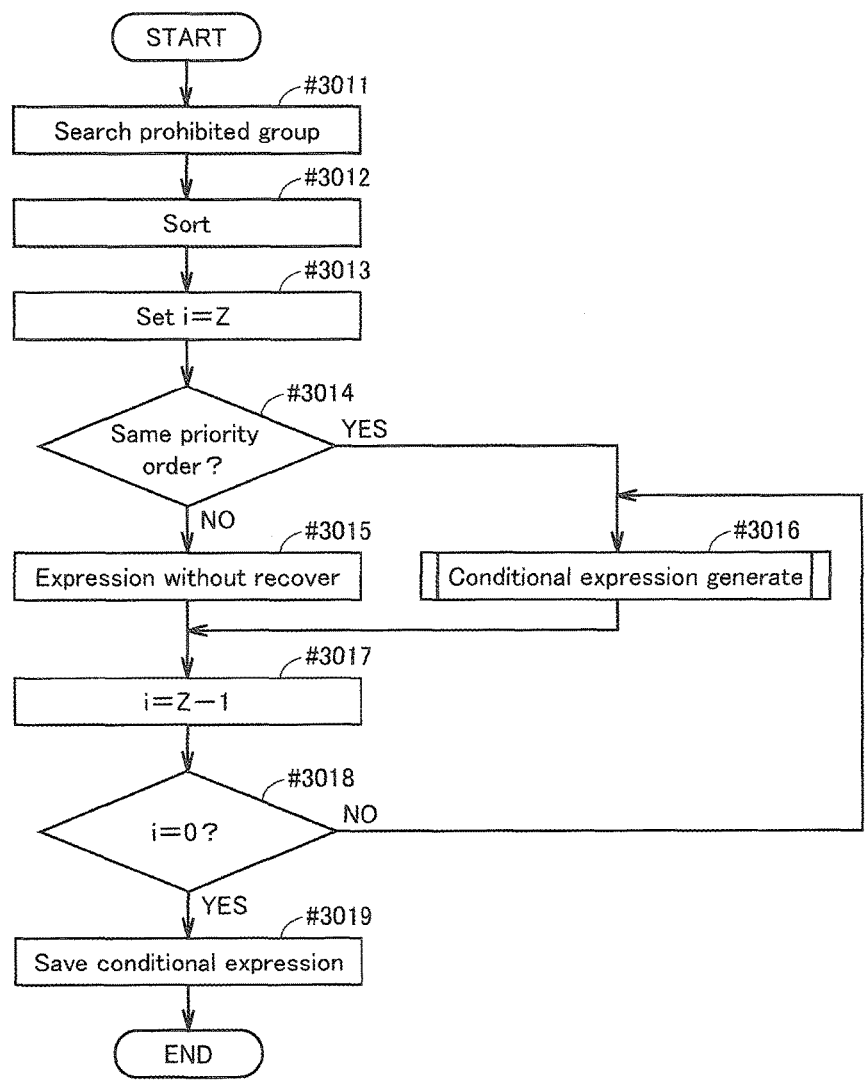
FIG. 35 shows a flowchart for explanation of an example of overall flow of processing of a prohibition avoidance conditional expression generation.

FIG. 35 shows a flowchart for explanation of an example of overall flow of processing of a prohibition avoidance conditional expression generation.

Next, overall flow of processing executed by terminal device 2 based on the prohibition avoidance conditional expression generating program 3020P will be explained, referring to FIG. 35.

According to the prohibition avoidance conditional expression generating program 3020P, terminal device 2 executes generating process of a prohibition avoidance conditional expression, by the procedure shown in FIG. 35.

Terminal device 2 searches a prohibited group in prohibition group table 3141 (See FIG. 28) (#3011). When a prohibited group was found, items which constitute the prohibited group are arranged in descending order of priority (#3012). The priority of each item is based on priority dictionary table 3142 (See FIG. 29).

Terminal device 2 selects an item having lowest priority order in the prohibited group (#3013). Then, a prohibition avoidance conditional expression when the selected item is the trigger item and the other items are target items is generated, as follows. "Z" is number of dimensions of the prohibited group, and is "4" for prohibition group table 3141.

When the selected item is independently lowest (NO at #3014), terminal device 2 generates a prohibition avoidance conditional expression which does not include a command type number and Recover Value (#3015). This expression is the above mentioned expression (7).

On the other hand, when there is an item of which the priority is same as the selected item (YES at #3014), terminal device 2 attempts generating a prohibition avoidance conditional expression which includes the command type number and Recover Value (#3016). The generating procedure is above explained with FIG. 34. An example of the expression is the above mentioned expression (8). On the result of step #3016, a prohibition avoidance conditional expression which does not include them may be generated.

Next, terminal device 2 selects an item with next higher priority order in the prohibited group (#3017), and generates a prohibition avoidance conditional expression when the newly selected item is the trigger item and the other items are the target items (#3016).

By repeating the above mentioned process, terminal device 2 generates prohibition avoidance conditional expressions when each of items in the prohibited group is the trigger item and other items are the target items.

Next, terminal device 2 stores data indicating each of generated prohibition avoidance conditional expressions as conditional expression data 3060 in conditional expression storage unit 3150 (#3019).

Next, the usage of a prohibition avoidance conditional expression will be explained.

Figure 36:
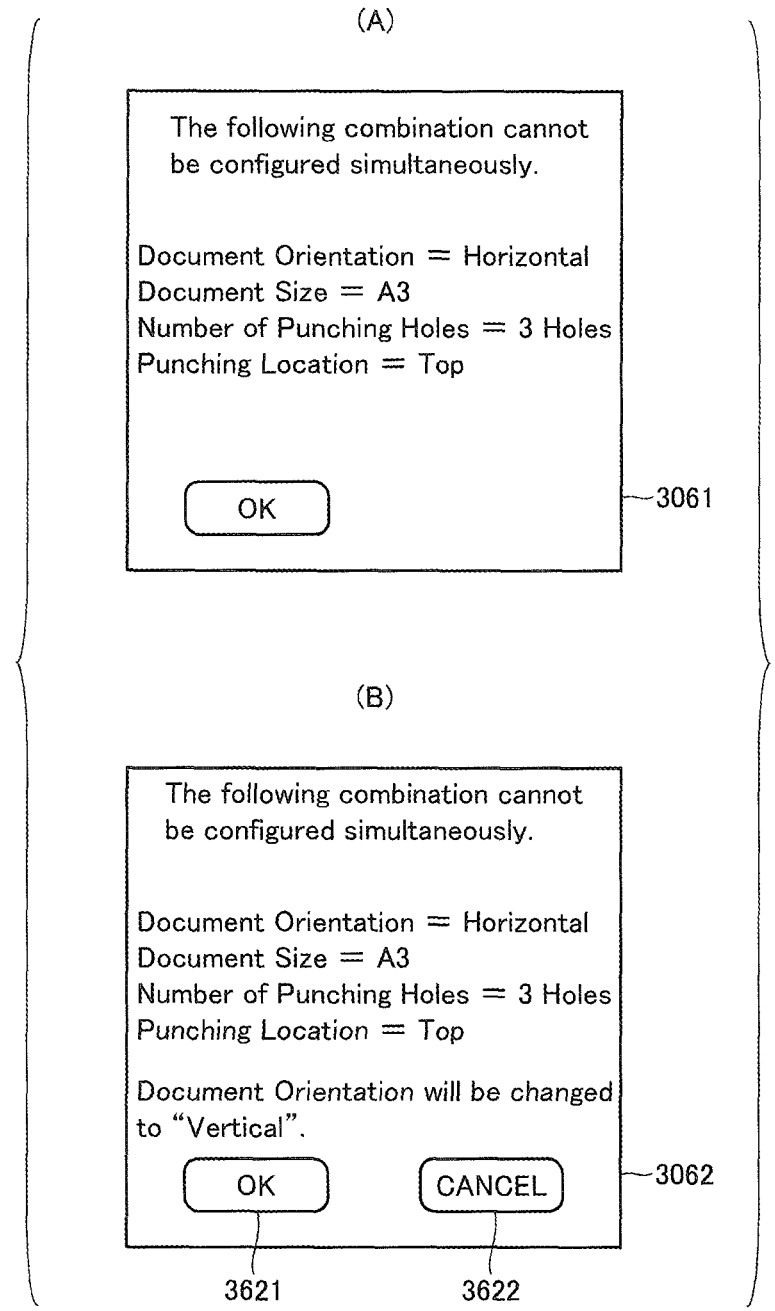
FIG. 36 shows examples of dialog screens 3061 and 3062.

FIG. 36 shows examples of dialog screens 3061 and 3062.

Terminal device 2 uses the prohibition avoidance conditional expression generated by the prohibition avoidance conditional expression generating program 3020P, as follows.

When prohibited relationship information receiving unit 3105 receives the detection result 2451 in which there is a prohibited relationship among the present setting values from prohibited relationship output unit 2406, dialog display unit 3106 reads condition expression data 3060 related to the prohibited relationship from conditional expression storage unit 3150, and displays the following screen on touch panel display 10e, based on the prohibition avoidance conditional expression.

When neither a command type number nor a Recover Value is indicated in the prohibition avoidance conditional expression, namely it is a prohibition avoidance conditional expression such as the above mentioned expression (7), dialog display unit 3106 displays dialog screen 3061 such as FIG. 36(A).

In dialog screen 3061, the members of the group (the prohibited group), and a message to show they can not be configured simultaneously. Then, the present input is denied. Namely, the user can not configure the input value.

On the other hand, when a command type number and a Recover Value are indicated in the prohibition avoidance conditional expression, namely it is a prohibition avoidance conditional expression such as the above mentioned expression (8), dialog display unit 3106 displays dialog screen 3062 such as FIG. 36(B).

As dialog screen 3061, dialog screen 3062 displays the members of the group, and a message to show they can not be configured simultaneously. Further, dialog screen 3062 displays a message to suggest change to avoid the prohibited relationship. The messages are based on the Recover Value and the item related to it. According to the example of expression (8), "vertical" in " . . . , document orientation, horizontal, vertical" in the right side is the Recover Value, and the "document orientation" is the item.

Next, when OK button 3621 is selected, the present input is accepted and configured. Further, as the suggestion, the configured value is configured again (changed) in accordance with the prohibition avoidance conditional expression. For example, for the expression (8), the value of the document orientation is configured again to "vertical". This is one of the prohibition processes.

Further, when there is another prohibition process corresponding to the command type number, it is executed. For example, when the prohibition process is a gray out process for a control, setting screen display unit 3107 grays out the control of the item of which the value was configured again (displays the control in a form in which it can not be selected), and displays the screen for configuration. Herewith, the user can not configure the item again. Further, setting screen display unit 3107 performs hiding options for the value of the prohibited group in response to the control type, as the prohibition process, for example. The contents of the prohibition process are as described in the first prohibition process table 3144 of FIG. 32, or the second prohibition process table 3145 of FIG. 33.

Or, when cancel button 3622 is selected, the present input is denied. The reconfiguration and the prohibition process of the value are not performed.

The Effect of the Embodiment

According to this embodiment, a prohibited relationship is detected, based on an inter resolve PJL table prohibition table which indicates a prohibited relationship of setting values of which the input is received on the terminal device. Then, a prohibited relationship can be detected, at the timing when a user performs configuration on the terminal device. Before the generating process of PJL, a prohibited relationship can be detected. Hence, convenience is improved. When changing specifications of prohibition on market demand, and the prohibition information is updated on the image forming apparatus side (the main body side), the contents of the inter resolve PJL table prohibition table at the terminal device side (driver side) is automatically updated. Then, update work on the terminal device 2 side is unnecessary.

Others

The above mentioned generating process of the prohibited combination information can be performed before receiving the change of setting values on dialog box 1071 (FIG. 5), of after receiving the change of setting values.

According to the embodiments, a prohibited relationship detection device and a control program for the prohibited relationship detection device which can improve convenience are provided.

The processes in the above-mentioned embodiments can be performed by software and a hardware circuit. A computer program which executes the processes in the above embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to a device via communication lines like the interne. The processes explained in the above flowcharts and the description are executed by a CPU in line with the program.

Although the present invention has been described and illustrated in detail, it is clearly understood that the same is by way of illustrated and example only and is not to be taken by way limitation, the scope of the present invention being interpreted by terms of the appended claims.

What is claimed is:

1. A prohibited relationship detection device to detect a prohibited relationship among a plurality of setting values related to job conditions, wherein the prohibited relationship indicates relationship which is prohibited from being applied simultaneously on a device which performs jobs, comprising:
   a first storage unit to store an index table to classify a plurality of configuration items of which input of a setting value is received on the prohibited relationship detection device into a plurality of resolve tables,
   a second storage unit to store the plurality of resolve tables which indicate relationship between setting values of which input is received on the prohibited relationship detection device and job language setting values, wherein the job language setting values indicate the setting values of which input is received on the prohibited relationship detection device in a language used at a side of the device which performs jobs,
   a third storage unit to store a prohibition table which indicates a combination of setting values of which input is received on the prohibited relationship detection device having a prohibited relationship,
   a receiving unit to receive change of a setting value which relates to the job condition, and
   a hardware processor configured to detect presence or absence of a prohibited relationship between the setting value of which the change was received on the receiving unit and other setting values configured on the prohibited relationship detection device, based on the index table, the resolve tables and the prohibition table, when the change was received by the receiving unit.

2. The prohibited relationship detection device according to claim 1, wherein
   the prohibition table includes a resolve table ID to identify a resolve table which relates to setting values having a prohibited relationship, and a resolve table inner index corresponding to setting values having a prohibited relationship in the resolve table, when the job language setting value of setting values having a prohibited relationship is a fixed value selective type in which a value is selected among a plurality of fixed values.

3. The prohibited relationship detection device according to claim 2, wherein the hardware processor is further configured to identify the resolve table ID and the resolve table inner index, which relate to setting value of which change was received by the receiving unit, based on the index table, when the setting value of which change was received by the receiving unit is the fixed value selective type, extract the resolve table inner index and the setting value having a prohibited relationship with the resolve table ID and the resolve table inner index identified, from the prohibition table, and compare the resolve table inner index and the setting value extracted, with the other setting values, to detect presence or absence of a prohibited relationship.

4. The prohibited relationship detection device according to claim 1, wherein the prohibition table includes a resolve table ID which is information to identify a resolve table which relates to setting values having a prohibited relationship, a resolve table inner index corresponding to setting values having a prohibited relationship on the resolve table, and the job language setting values of setting values having a prohibited relationship, when the job language setting values of setting values having a prohibited relationship is a variable type as a value or a character string.

5. The prohibited relationship detection device according to claim 4, wherein the hardware processor is further configured to identify the resolve table ID and the resolve table inner index, which relate to setting value of which change was received by the receiving unit, based on the index table, when the setting value of which change was received by the receiving unit is the variable type, convert the setting values of which change was received by the receiving unit to the job language setting values, based on the resolve table ID and the resolve table inner index identified, extract the resolve table inner index and the setting value having a prohibited relationship with the resolve table ID and the resolve table inner index identified, and the job language setting values converted, and compare the resolve table inner index and the setting value extracted, with the other setting values, to detect presence or absence of a prohibited relationship.

6. The prohibited relationship detection device according to claim 1, wherein the hardware processor is further configured to acquire information of a prohibited relationship from the device which performs jobs, and generate the prohibition table, based on the acquired information and the resolve table.

7. The prohibited relationship detection device according to claim 6, wherein the hardware processor is further configured to generate the prohibition table before receiving change by the receiving unit.

8. The prohibited relationship detection device according to claim 6, wherein the hardware processor is further configured to generate the prohibition table after receiving change by the receiving unit.

9. The prohibited relationship detection device according to claim 1, wherein the hardware processor is further configured to generate a prohibition avoidance conditional expression which prescribes a condition to avoid a prohibited relationship, based on a priority dictionary table which describes priorities of a plurality of configuration items of which input of setting values is received on the prohibited relationship detection device, and an attribute table which describes attributes of a plurality of configuration items of which input of setting values is received on the prohibited relationship detection device, and a prohibition process table which describes processes to avoid a prohibited relationship corresponding to a control type, and avoid the prohibited relationship by changing setting values configured on the prohibited relationship detection device, in accordance with the prohibition avoidance conditional expression, when the prohibited relationship was detected.

10. A non-transitory computer-readable recording medium storing a controlling program for a prohibited relationship detection device to detect a prohibited relationship among a plurality of setting values related to job conditions, wherein the prohibited relationship indicates relationship which is prohibited from being applied simultaneously on a device which performs jobs, wherein the prohibited relationship detection device comprises:

a first storage unit to store an index table to classify a plurality of configuration items of which input of a setting value is received on the prohibited relationship detection device into a plurality of resolve tables, a second storage unit to store the plurality of resolve tables which indicate relationship between setting values of which input is received on the prohibited relationship detection device and job language setting values, wherein the job language setting values indicates the setting values of which input is received on the prohibited relationship detection device in a language used at a side of the device which performs jobs, and a third storage unit to store a prohibition table which indicates a combination of setting values of which input is received on the prohibited relationship detection device having a prohibited relationship, and the program causing a computer to execute the steps of:

receiving change of a setting value which relates to the job condition, and detecting presence or absence of a prohibited relationship between the setting value of which change was received and other setting values configured on the prohibited relationship detection device, based on the index table, the resolve tables and the prohibition table, when the change was received.

* * * * *